US012731528B2

(12) United States Patent
Park et al.

(10) Patent No.: US 12,731,528 B2
(45) Date of Patent: Sep. 8, 2026

(54) DISPLAY DEVICE AND METHOD OF DRIVING DISPLAY DEVICE

(71) Applicant: Samsung Display Co., LTD., Yongin-si (KR)

(72) Inventors: Jong Hwan Park, Yongin-si (KR); Ki Nyeng Kang, Yongin-si (KR); Jong Hwan Cha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/733,242

(22) Filed: Jun. 4, 2024

(65) Prior Publication Data

US 2025/0095551 A1 Mar. 20, 2025

(30) Foreign Application Priority Data

Sep. 18, 2023 (KR) ........................ 10-2023-0124112

(51) Int. Cl.
*G09G 3/32* (2016.01)

(52) U.S. Cl.
CPC ....... *G09G 3/32* (2013.01); *G09G 2300/0842* (2013.01); *G09G 2310/0275* (2013.01); *G09G 2320/0233* (2013.01); *G09G 2320/0271* (2013.01); *G09G 2330/10* (2013.01)

(58) Field of Classification Search
CPC ............. G09G 3/32; G09G 2300/0842; G09G 2310/0275; G09G 2320/0233; G09G 2320/0271; G09G 2330/10
See application file for complete search history.

(56) References Cited

U.S. PATENT DOCUMENTS

| | | | | |
|---|---|---|---|---|
| 10,262,582 | B2 | 4/2019 | Han | |
| 2020/0111455 | A1* | 4/2020 | Lee | G09G 5/373 |
| 2020/0265779 | A1* | 8/2020 | In | G09G 3/3225 |
| 2022/0084461 | A1* | 3/2022 | Lee | G09G 3/32 |
| 2022/0148492 | A1* | 5/2022 | Yoon | G09G 3/32 |

FOREIGN PATENT DOCUMENTS

| | | |
|---|---|---|
| KR | 10-2425795 | 7/2022 |

* cited by examiner

*Primary Examiner* — Nitin Patel
*Assistant Examiner* — Amen W Bogale
(74) *Attorney, Agent, or Firm* — Womble Bond Dickinson (US) LLP

(57) ABSTRACT

A display device may include a plurality of pixels. Each of the plurality of pixels may include a plurality of stages electrically connected in series. Each of the plurality of stages may include a plurality of light emitting elements. A storage component may store location information of a defective pixel having a defect in the plurality of stages. A compensation component may generate compensated data by compensating for a grayscale value in image data of a normal pixel based on a first degradation coefficient, and by compensating for a grayscale value of the defective pixel corresponding to the location information based on a second degradation coefficient different from the first degradation coefficient, and thus generate compensated data. A data driver may generate data voltages based on the compensated data, and provide the data voltages to the plurality of pixels.

20 Claims, 9 Drawing Sheets

FIG. 7

INFO_P1 INFO_P2

LUT

| | | | |
|---|---|---|---|
| 0 | 1 | 0 | ··· |
| 0 | 0 | 0 | ··· |
| 0 | 0 | 0 | ··· |
| ⋮ | ⋮ | ⋮ | ⋱ |

FIG. 8

INFO_S1 INFO_S2

LUT

| | | | |
|---|---|---|---|
| A (1) | B (2) | 0 (0) | ··· |

CTE1: CTE1-1, CTE1-2
CTE2: CTE2-1, CTE2-2
CTE3: CTE3-1, CTE3-2
EMU_1: SET1_1, SET2_1, SET3, SET4
LD: LD1, LD2, LD3, LD4

DISPLAY DEVICE AND METHOD OF DRIVING DISPLAY DEVICE

CROSS-REFERENCE TO RELATED APPLICATIONS

This application claims priority under 35 U.S.C. § 119 to Korean Patent Application No. 10-2023-0124112, filed Sep. 18, 2023, in the Korean Intellectual Property Office, the entire contents of which are incorporated herein by reference.

BACKGROUND

1. Technical Field

Various embodiments of the disclosure relate to a display device and a method of driving the same.

2. Description of the Related Art

With an increase in interest in an information display and an increase in demand to use portable information media, demand for display devices may be markedly increased, and commercialization thereof may be in progress.

In the case where a display device is driven for a relatively long period of time, light emitting elements may degrade, thus resulting in degradation in luminance or display quality of the display device for the same image data. The display device may accumulate the driving time and compensate for image data based on the accumulated driving time, thus compensating for degradation in luminance or display quality of the display device.

SUMMARY

Various embodiments of the disclosure are directed to a display device having enhanced display quality, and a method of driving the display device.

An embodiment of the disclosure may provide a display device, including a display panel including a plurality of pixels, each of the plurality of pixels including a plurality of stages electrically connected in series, each of the plurality of stages including a plurality of light emitting elements; a storage component that stores location information of at least one defective pixel having a defect in the plurality of stages among the plurality of pixels; a compensation component that generates data by compensating for a grayscale value in image data of a normal pixel among the plurality of pixels based on a first degradation coefficient, and by compensating for a grayscale value of the at least one defective pixel corresponding to the location information based on a second degradation coefficient different from the first degradation coefficient; and a data driver that generates data voltages based on the compensated data, and provide the data voltages to the plurality of pixels.

Each of the first degradation coefficient and the second degradation coefficient may comprise a coefficient in an equation defining a luminance of a corresponding pixel that degrades based on a driving time of the corresponding pixel. A change in the luminance may increase as the coefficient increases.

The second degradation coefficient of the at least one defective pixel may be greater than the first degradation coefficient of the normal pixel.

Each of the first degradation coefficient and the second degradation coefficient may include a grayscale coefficient, a temperature coefficient, a frequency coefficient, and an emission duty coefficient that respectively represent a grayscale value, a driving temperature, a driving frequency, and a change in the luminance according to an emission duty of the plurality of pixels.

Each of the plurality of pixels may further include an identical pixel circuit that provides driving current to the plurality of stages. A numbers of stages included in the plurality of stages for each of the plurality of pixels may be identical to each other. Each of the plurality of light emitting elements of each of the plurality of pixels may have an identical size and emit light of an identical color.

A stage of the plurality of stages of the at least one defective pixel may have a short-circuit defect or a portion that has been repaired due to the short-circuit defect. At least one of the plurality of light emitting elements in the stage that includes the short-circuit defect may not emit light, and the plurality of light emitting elements in each of another ones of the plurality of stages in the at least one defective pixel may emit light.

Each of the plurality of pixels may be composed of two stages. The storage component may be absent of location information of the normal pixel and may be absent of information about a number of defective stages in each of the at least one defective pixel.

Each of the plurality of pixels may include at least three stages. The at least one defective pixel may include a first defective pixel that may be composed of one defective stage having at least one defective light emitting element, and a second defective pixel that may be composed of two defective stages that each may include at least one defective light emitting element. The storage component may store location information of each of the first and the second defective pixels and information about a number of defective stages within each of the first and the second defective pixels.

The compensation component may compensate for the grayscale value of the first defective pixel based on the second degradation coefficient, and may compensate for the grayscale value of the second defective pixel based on a third degradation coefficient different from the first and the second degradation coefficients.

The compensation component may calculate a first compensation value to compensate for the grayscale value of the normal pixel based on the first degradation coefficient, and calculate a second compensation value to compensate for the grayscale value of the at least one defective pixel based on the second degradation coefficient. The second compensation value may be greater than the first compensation value under conditions of an identical driving time and a same grayscale value in the image data.

The compensation component may include an accumulation circuit that accumulates a grayscale value in the compensated data and calculates a driving time; a memory device that stores the driving time; and a compensation circuit that calculates a compensation value of each of the plurality of pixels based on the driving time and the first and the second degradation coefficients, and compensates for the grayscale value in the image data using the compensation value.

Each of the plurality of pixels may further include a first transistor electrically connected between a first power line and a second power line; a second transistor electrically connected between a data line and a gate electrode of the first transistor; a third transistor electrically connected between a non-gate electrode of the first transistor and a sensing line; and a storage capacitor electrically connected between the gate electrode and the non-gate electrode of the first transistor. The plurality of stages may be electrically connected between the non-gate electrode of the first transistor and the second power line.

An embodiment of the disclosure may provide a method comprising providing a display device that includes a plurality of pixels, each of the plurality of pixels includes a plurality of stages electrically connected in series, each of the plurality of stages includes a plurality of light emitting elements. The method may further include detecting at least one defective pixel having a defect in the plurality of stages among the plurality of pixels by applying a driving voltage to the display device; acquiring a first degradation coefficient of a normal pixel and a second degradation coefficient of the at least one defective pixel by the applying of the driving voltage to the display device for a reference time; and storing location information of the at least one defective pixel and the first and the second degradation coefficients in a storage component of the display device.

The first degradation coefficient may include a coefficient in an equation defining a luminance of the normal pixel that degrades based on a driving time of the normal pixel. The second degradation coefficient may be a coefficient in an equation defining a luminance of the at least one defective pixel that degrades based on a driving time of the defective pixel. A change in the luminance may increase as any of the first and second degradation coefficients increase. The second degradation coefficient of the at least one defective pixel may be greater than the first degradation coefficient of the normal pixel.

Each of the plurality of pixels may further include an identical pixel circuit that provides a driving current to the plurality of stages. Each of the plurality of pixels may include a same number of stages. Each of the plurality of light emitting elements of each of the plurality of pixels may have an identical size and emit light of an identical color.

The detecting of the at least one defective pixel may include capturing an image of the display device and acquiring a thermal infrared image; detecting a defective stage having the at least one defective light emitting element among the plurality of stages from the thermal infrared image; and acquiring the location information of the at least one defective pixel based on the defective stage.

Each of the plurality of pixels may be composed of two stages. The detecting of the at least one defective pixel may include acquiring only the location information of the defective pixel and may be absent of acquiring location information of the normal pixel and may be absent of acquiring information about a number of defective stages.

Each of the plurality of pixels may include at least three stages. The at least one defective pixel may include a first defective pixel composed of one defective stage having at least one defective light emitting element, and a second defective pixel including two defective stages each having at least one defective light emitting element. The detecting of the at least one defective pixel may include acquiring location information of each of the first and the second defective pixels and information about a number of defective stages.

Each of the first degradation coefficient and the second degradation coefficient may include a grayscale coefficient, a temperature coefficient, a frequency coefficient, and an emission duty coefficient that respectively represent a grayscale value, a driving temperature, a driving frequency, and a change in luminance according to an emission duty of the pixels. The acquiring of the first and the second degradation coefficients each may include acquiring the grayscale coefficient while changing the grayscale value; acquiring the temperature coefficient while changing the driving temperature; acquiring the frequency coefficient while changing the driving frequency; and acquiring the emission duty coefficient while changing the emission duty.

The method may further include generating compensated data by compensating for a grayscale value in image data of the normal pixel among the plurality of pixels based on the first degradation coefficient, and by compensating for a grayscale value of the at least one defective pixel based on the second degradation coefficient different from the first degradation coefficient; generating data voltages based on the compensated data, and providing the data voltages to the plurality of pixels.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7 and 8 are schematic diagrams illustrating an example of a lookup table including information about a defective pixel.

DETAILED DESCRIPTION OF THE EMBODIMENTS

Figure 1:
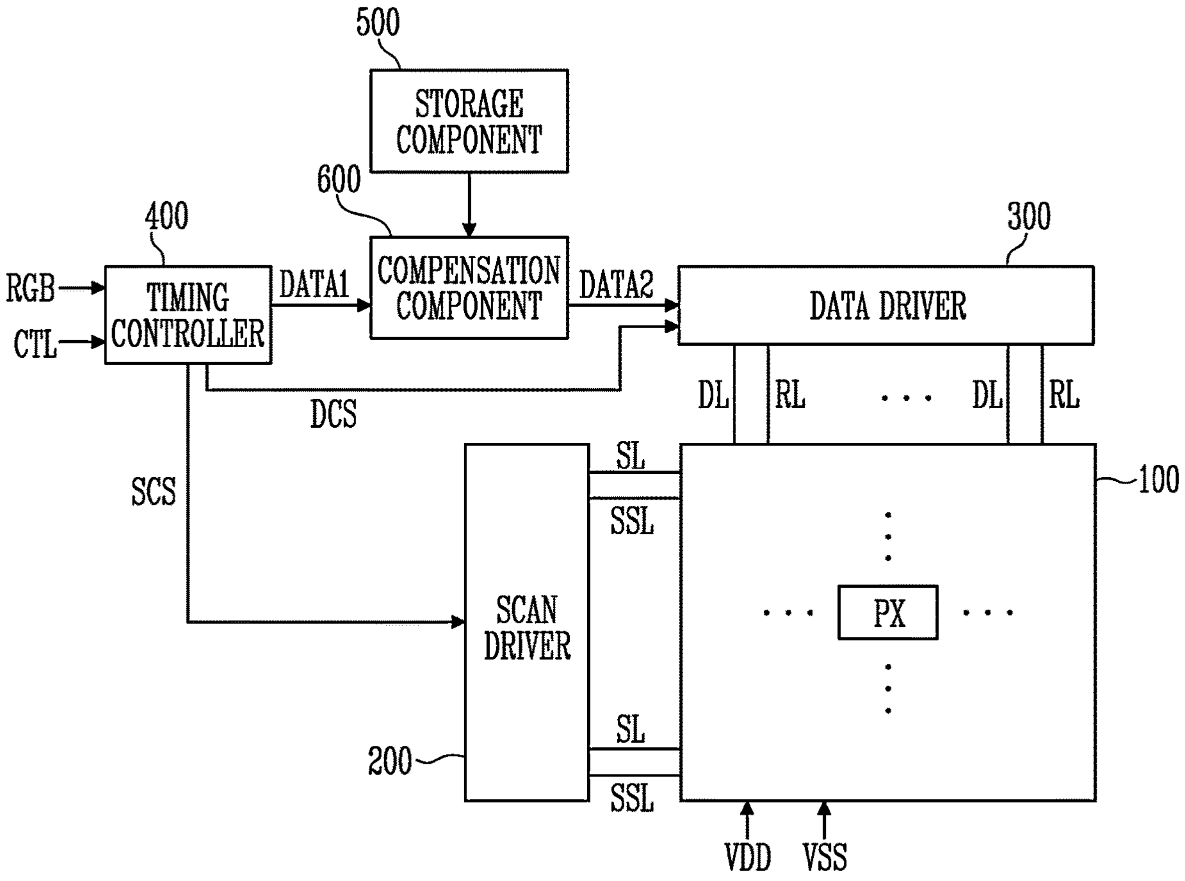
FIG. 1 is a schematic block diagram illustrating a display device in accordance with an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, portions, and/or modules. Those skilled in the art will appreciate that these blocks, portions, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, portions, and/or modules being implemented by microprocessors or other similar hardware, they may be programmed and controlled using software (e.g., microcode) to perform various functions discussed herein and may optionally be driven by firmware and/or software. It is also contemplated that each block, portion, and/or module may be implemented by dedicated hardware, or as a combination of dedicated hardware to perform some functions and a processor (e.g., one or more programmed microprocessors and associated circuitry) to perform other functions. Also, each block, portion, and/or module of some embodiments may be physically separated into two or more interacting and discrete blocks, portions, and/or modules without departing from the scope of the Inventive concepts. Further, the blocks, portions, and/or modules of some embodiments may be physically combined into more complex blocks, portions, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

"Hereinafter, a display device in accordance with embodiments will be described with reference to the accompanying drawings.

FIG. 1 is a schematic block diagram illustrating a display device in accordance with an embodiment.

Referring to FIG. 1, the display device may include a display component 100 (or a display panel), a scan driver 200, a data driver 300, a timing controller 400, a storage component 500, and a compensation component 600.

The display device may refer to any electronic device configured to provide a display screen, or may be applied to the any electronic device. Examples of the display device may include a television, a laptop, a monitor, a billboard, an Internet of Things device, a mobile phone, a smartphone, a tablet (personal computer) PC, an electronic watch, a smartwatch, a watch phone, a head-mounted display, a mobile communication terminal, an electronic notepad, an e-book, a portable multimedia player (PMP), a navigation device, a gaming console, a digital camera, a camcorder, and the like, providing a display screen.

The display device may be implemented as a self-emissive display device including multiple self-emissive elements. For example, the display device may be an inorganic light emitting display device including inorganic light emitting elements. However, the disclosure may not be limited to the aforementioned examples, and the display device may be an organic light emitting display device including organic light emitting elements, or a display device including light emitting elements configured of a combination of inorganic material and organic material.

The display component 100 may include a pixel PX (or pixels) connected to a data line DL, a first scan line SL, a second scan line SSL, and a sensing line RL. The display component 100 (or the pixel PX) may be supplied with a first driving voltage VDD, a second driving voltage VSS, and an initialization voltage Vint from external devices. Detailed configuration of the pixel PX will be described below with reference to FIG. 2.

In response to a scan control signal SCS, the scan driver 200 may supply a first scan signal to the first scan line SL and supply a second scan signal to the second scan line SSL. The scan control signal SCS may include a scan start signal (or a start pulse), scan clock signals, and the like, and may be provided from the timing controller 400 to the scan driver 200. For example, the scan driver 200 may include a shift register that sequentially generates and outputs, using scan clock signals, a pulse-type first scan signal and/or a pulse-type second scan signal corresponding to a pulse-type scan start signal (e.g., a gate-on voltage level pulse to turn on a transistor).

The data driver 300 may generate a data signal (or a data voltage) based on a data control signal DCS and compensated data DATA2, and provide data signals to the data line DL. The data control signal DCS may be a signal provided from the timing controller 400 to control the operation of the data driver 300, and may include a load signal (or a data enable signal) or the like to output a valid data voltage. The compensated data DATA2 may be provided from the compensation component 600.

In an embodiment, the data driver 300 may generate a data signal corresponding to a data value (or a grayscale value) included in the compensated data DATA2 using gamma voltages. The gamma voltages may be generated from the data driver 300 or provided from a separate gamma voltage generation circuit (e.g., a gamma integrated circuit). For example, the data driver 300 may select one of the gamma voltages based on the data value, and output the selected gamma voltage as a data signal.

The data driver 300 may supply an initialization voltage Vint to the sensing line RL during a display period (i.e., a period during which an image may be displayed on the display component 100). Furthermore, the data driver 300 may sense light emitting characteristics of the pixel PX through the sensing line RL during a sensing period. The light emitting characteristics of the pixel PX may include a threshold voltage and mobility of at least one transistor (e.g., a driving transistor) in the pixel PX, and characteristic information (e.g., current-voltage characteristics) of the light emitting element.

Although there is illustrated the case where the sensing line RL is electrically connected to the data driver 300, it may not be limited thereto. For example, a sensing component (or a sensing circuit) separately provided from the data driver 300 may be electrically connected to the sensing line RL.

The timing controller 400 may receive a control signal CTL and an image signal RGB from a processor such as an external graphic device. The timing controller 400 may generate a data control signal DCS and a scan control signal SCS, in response to a control signal CTL. The timing controller 400 may supply to the compensation component 600 image data DATA1 obtained by rearranging the image signal RGB according to the arrangement of the pixels PX in the display component 100.

The storage component 500 may include location information of a defective pixel. If defects (e.g., short circuits) occur in some stages among stages SET1 and SET2 (refer to FIG. 2) of a pixel PX, or the defected portions may be repaired (e.g., removed) and at least some (or at least one) of the light emitting elements in the some stages do not normally emit light or do not emit any light, the pixel PX may be referred to as a defective pixel (or a faulty pixel). On the other hand, a pixel PX without defects in the stages SET1 and SET2 may be referred to as a normal pixel.

In an embodiment, in the case where the pixel PX includes three or more stages, the storage component 500 may include not only location information of a defective pixel but also information about the number of defective stages (i.e., stages in which defects have occurred) in the defective pixel or information corresponding to the number of defective stages (e.g., information about the number of normal stages).

Furthermore, the storage component 500 may further include lifespan data representing a driving time (or an accumulated driving time) of the pixel PX. The driving time refers to an accumulated time during which the pixel PX has been driven since the display device has been manufactured, and may be equal to or proportional to a value obtained by multiplying a grayscale value for the pixel PX in the compensated data DATA2 by a time driven with the grayscale value. For example, the driving time may be acquired by further considering, on the value, factors such as a weight based on a driving temperature of the display device, a weight based on a driving frequency of the display device, and a weight based on an emission duty of the pixel PX. For example, in the case where the driving temperature is relatively high, the driving frequency is relatively high, or the emission duty is relatively large, the driving time may be calculated to be longer.

The storage component 500 may be implemented using a nonvolatile memory device such as an erasable programmable read-only memory (EPROM), an electrically erasable programmable read-only memory (EEPROM), a flash memory, phase change random access memory (PRAM), a resistance random access memory (RRAM), a nano floating gate memory (NFGM), a polymer random access memory (PoRAM), a magnetic random access memory (MRAM), or a ferroelectric random access memory (FRAM).

The compensation component 600 may compensate for a grayscale value for the pixel PX in the image data DATA1 based on a degradation coefficient, thus generating the compensated data DATA2. Here, the degradation coefficient (or degradation constant, accelerated lifespan coefficient) may be a coefficient of an equation (or degradation curve, lifespan curve) that defines or estimates the luminance of the pixel PX degrading as the driving time of the pixel PX passes. As the coefficient increases, the change in luminance may also increase. For example, the equation may be a stretched exponential function, but may not be limited thereto.

For instance, the degradation curve representing the luminance of the pixel PX degrading as the driving time of the pixel PX passes may be defined by the following equation 1.

$$L(t) = \exp\left[-\left(\frac{t}{\tau}\right)^{\beta}\right] \quad \text{[Equation 1]}$$

Here, L(t) represents a luminance (or estimated luminance) decreased as a function of the driving time (t) of the pixel PX and, for example, may be a ratio of a decreased luminance to an initial maximum luminance of the pixel PX. The variable t may represent the driving time of the pixel PX. The symbols $\tau$ and $\beta$ may be experimentally determined degradation coefficients.

In an embodiment, the compensation component 600 may compensate for a grayscale value for a normal pixel based on a first degradation coefficient, and compensate for a grayscale value for a defective pixel corresponding to the location information based on a second degradation coefficient different from the first degradation coefficient. For example, the compensation component 600 may compensate for a grayscale value in the image data DATA1 based on the first degradation coefficient, and compensate for a grayscale value in the image data DATA1 corresponding to the location information based on the second degradation coefficient. For instance, the compensation component 600 may produce a first compensation value to compensate for the grayscale value of the normal pixel based on the first degradation coefficient, and may produce a second compensation value to compensate for the grayscale value of the defective pixel based on the second degradation coefficient. Under conditions in which the driving time may be the same and the grayscale values in the image data DATA1 may be the same, the second compensation value may be greater than the first compensation value.

Although will be described below, for the same grayscale value (or the same luminance), relatively high voltage and/or driving current may be applied to light emitting elements of the defective pixel compared to the normal pixel as the defective pixel may degrade more rapidly than the normal pixel. As the degradation of the defective pixel accelerates, the degradation characteristics of the defective pixel may become worse than the degradation characteristics of the normal pixel. Even if the defective pixel and the normal pixel are structurally the same (e.g., even if the pixel circuits of the defective pixel and the normal pixel are the same, and the size, number, color, etc., of the light emitting elements provided in the defective pixel and the normal pixel are substantially the same), it may be difficult to define the degradation characteristics of the defective pixel and the normal pixel with only a single equation (or a single degradation coefficient). Therefore, the compensation component 600 separately includes the second degradation coefficient different from the first degradation coefficient for the normal pixel, and can use the second degradation coefficient to compensate for the degradation of the defective pixel.

Because the defective pixel degrades more rapidly than the normal pixel, the second degradation coefficient for the defective pixel may be greater than the first degradation coefficient for the normal pixel, but may not be limited thereto.

The first degradation coefficient and the second degradation coefficient may be stored in the compensation component 600, but the disclosure may not be limited thereto. For example, the first degradation coefficient and the second degradation coefficient may be stored in the storage component 500 and loaded into the compensation component 600. As another example, in lieu of the first degradation coefficient, a relationship between grayscale values (i.e., pre-compensation grayscale values) and compensated grayscale values for respective driving times according to the first degradation coefficient may be stored as a lookup table in the compensation component 600 or the storage component 500. Likewise, a lookup table according to the second degradation coefficient may be stored in the compensation component 600 or the storage component 500.

As described above, the display device (or the compensation component 600) may compensate for the grayscale value for the normal pixel based on the first degradation coefficient, and compensate for the grayscale value for the defective pixel based on the second degradation coefficient different from the first degradation coefficient. Therefore, the degradation of the defective pixel may be more accurately compensated for, whereby the display quality can be enhanced.

Although FIG. 1 illustrates that the scan driver 200, the data driver 300, the timing controller 400, and the compensation component 600 may be configured independently from each other, this configuration may be illustrative, and the disclosure may not be limited thereto. For example, at least one of the scan driver 200, the data driver 300, the timing controller 400, and the compensation component 600 may be provided in the display component 100, or may be implemented as an integrated circuit. For example, the scan driver 200 may be provided in the display component 100. For example, at least two of the scan driver 200, the data driver 300, the timing controller 400, and the compensation component 600 may be implemented as a single integrated circuit.

Figure 2:
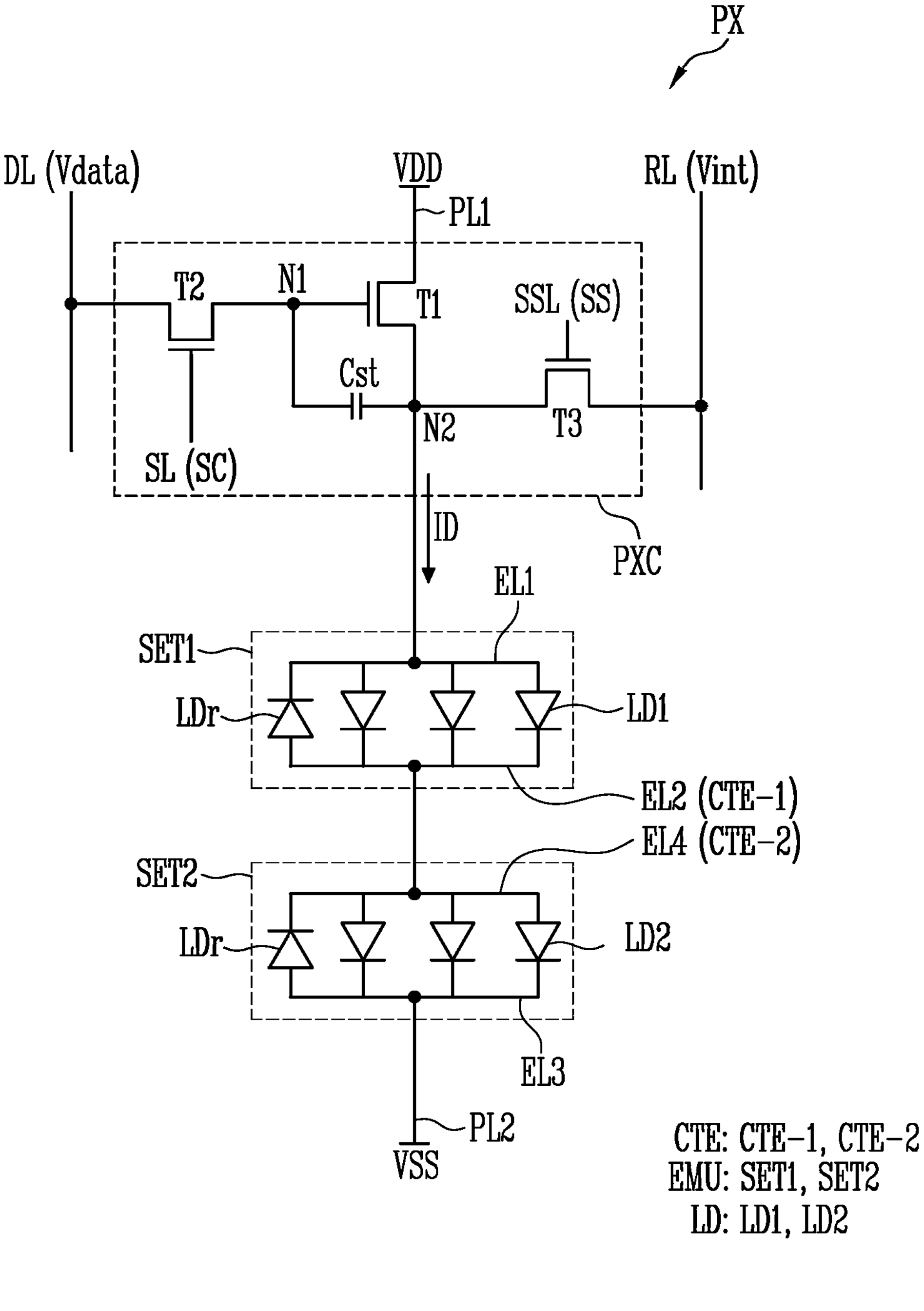
FIG. 2 is a schematic diagram of an equivalent circuit of a pixel included in the display device of FIG. 1.

FIG. 2 is a schematic diagram of an equivalent circuit of a pixel PX included in the display device of FIG. 1. The pixels PX included in the display device of FIG. 1, i.e., normal pixels and defective pixels, may be the same as each other. For example, the structure/size of the pixel circuit PXC and the emission portion EMU, and each of the size, number, and color of the light emitting elements LD may be the same for all pixels PX (i.e., all of the normal pixels and the defective pixels).

Referring to FIG. 2, the pixel PX may include an emission portion EMU configured to generate light having a luminance corresponding to a data signal. Furthermore, the pixel PX may selectively further include a pixel circuit PXC configured to drive the emission portion EMU.

The emission portion EMU may include multiple light emitting elements LD electrically connected in parallel between a first power line PL1 to which a first driving voltage VDD may be applied and a second power line PL2 to which a second driving voltage VSS may be applied. For example, the emission portion EMU may include a first electrode EL1 electrically connected to the first power line PL1 via the pixel circuit PXC, a third electrode EL3 electrically connected to the second power line PL2, and multiple light emitting elements LD electrically connected in parallel between the first and third electrodes EL1 and EL3 in a same direction. In an embodiment of the disclosure, the first electrode EL1 may be an anode electrode, and the third electrode EL3 may be a cathode electrode.

Each of the light emitting elements LD included in the emission portion EMU may include an end electrically connected to the first power line PL1 through the first electrode EL1, and another end electrically connected to the second power line PL2 through the third electrode EL3.

The light emitting elements LD that may be electrically connected in parallel in a same direction between the first electrode EL1 and the third electrode EL3 that may be supplied with different potential voltages (i.e., the first driving voltage VDD and the second driving voltage VSS) may form a valid light source. Such valid light sources may be grouped to form the emission portion EMU of the pixel PX.

The light emitting elements LD of the emission portion EMU may emit light having a luminance corresponding to driving current ID supplied thereto through the pixel circuit PXC. For example, during each frame period, the pixel circuit PXC may supply driving current ID corresponding to a grayscale value of corresponding frame data {e.g., the compensated data DATA2 (refer to FIG. 1)} to the emission portion EMU. The driving current ID supplied to the emission portion EMU may be divided into parts which flow into the respective light emitting elements LD. Hence, each of the light emitting elements LD may emit light having a luminance corresponding to current applied thereto, so that the emission portion EMU may emit light having a luminance corresponding to the driving current ID.

The emission portion EMU may further include at least one invalid light source, e.g., a reverse light emitting element LDr, as well as including the light emitting elements LD that form the respective valid light sources. The reverse light emitting element LDr, along with the light emitting elements LD that form the valid light sources, may be electrically connected in parallel to each other between the first and third electrodes EL1 and EL3, and may be electrically connected between the first and third electrodes EL1 and EL3 in the opposite direction (or in a different polarity direction) from the light emitting elements LD. Even if a certain driving voltage (e.g., a normal directional driving voltage) may be applied between the first and third electrodes EL1 and EL3, the reverse light emitting element LDr remains disabled. Hence, current substantially does not flow through the reverse light emitting element LDr.

The pixel circuit PXC may be electrically connected to the first scan line SL, the second scan line SSL, the data line DL, and the sensing line RL of the corresponding pixel PX.

In an embodiment, the pixel circuit PXC may include first, second, and third transistors T1, T2, and T3 and a storage capacitor Cst. The structure of the pixel circuit PXC may not be limited to that of the embodiments illustrated in FIG. 2.

A first terminal (or first electrode) of the first transistor (T1; driving transistor) may be electrically connected to the first power line PL1, and a second terminal (or second electrode) thereof may be electrically connected to a second node N2 (or the first electrode EL1). A gate electrode of the first transistor T1 may be electrically connected to a first node N1. The first transistor T1 may control the amount of driving current ID to be supplied to the emission portion EMU in response to the voltage of the first node N1.

A first terminal of the second transistor (T2; switching transistor) may be electrically connected to the data line DL, and a second terminal thereof may be electrically connected to a first node N1. A gate electrode of the second transistor T2 may be electrically connected to the first scan line SL. In case that a first scan signal SC having a gate-on voltage (e.g., a high-level voltage) capable of turning on the second transistor T2 is supplied from the first scan line SL, the second transistor T2 may be turned on to electrically connect the data line DL with the first node N1. Here, a data signal Vdata of a corresponding frame may be supplied to the data line DL, whereby the data signal Vdata may be transmitted to the first node N1. The data signal Vdata transmitted to the first node N1 may be charged to the storage capacitor Cst.

An electrode of the storage capacitor Cst may be electrically connected to the first node N1, and another electrode thereof may be electrically connected to the second node N2. The storage capacitor Cst may be charged with a voltage corresponding to a data signal supplied to the first node N1, and may maintain the charged voltage until a data signal Vdata of a subsequent frame may be supplied.

A first terminal of the third transistor (T3; sensing transistor) may be electrically connected to a second node N2, and a second terminal thereof may be electrically connected to the sensing line RL. A gate electrode of the third transistor T3 may be electrically connected to the second scan line SSL. In the case where the sensing line RL is omitted, the second terminal of the third transistor T3 may be electrically connected to the data line DL. In the case where the second scan line SSL is omitted, the gate electrode of the third transistor T3 may be electrically connected to the first scan line SL. The third transistor T3 may be turned on by a second scan signal SS of a gate-on voltage that may be supplied to the second sensing line SSL during a certain sensing period, so that the sensing line RL and the second node N2 can be electrically connected to each other.

Although FIG. 2 illustrates the case where all of the first, second, and third transistors T1, T2, and T3 are N-type transistors, the disclosure may not be limited thereto. For example, at least one of the first, second, and third transistors T1, T2, and T3 may be changed to a p-type transistor. Furthermore, although FIG. 2 illustrates the case where the emission portion EMU is electrically connected between the pixel circuit PXC and the second power line PL2, the emission portion EMU may be electrically connected between the first power line PL1 and the pixel circuit PXC.

The emission portion EMU may include a first stage SET1 (or a first stack, a first sub-emission portion, a first element group) and a second stage SET2 (or a second stack, a second sub-emission portion, a second element group) that may be successively electrically connected between the first and second power lines PL1 and PL2. The emission portion EMU may include first, second, third, and fourth electrodes EL1, EL2, EL3, and EL4. Each of the first and second stages SET1 and SET2 may include multiple light emitting elements LD electrically connected in parallel between two electrodes of the electrodes EL1 to EL4 in a same direction.

The first stage SET1 may include the first electrode EL1 and the second electrode EL2 (or a first sub-intermediate electrode CET-1), and may include at least one first light emitting element LD1 electrically connected between the first electrode EL1 and the second electrode EL2 (or the first sub-intermediate electrode CTE-1).

The second stage SET2 may include the fourth electrode EL4 (or a second sub-intermediate CTE-2) and the third electrode EL3, and may include at least one second light emitting element LD2 electrically connected between the fourth electrode EL4 (or the second sub-intermediate CTE-2) and the third electrode EL3.

The first sub-intermediate electrode CTE-1 of the first stage SET1 and the second sub-intermediate electrode CTE-2 of the second stage SET2 may be integral with each other and electrically connected to each other. In other words, the first sub-intermediate electrode CTE-1 and the second sub-intermediate electrode CTE-2 may form an intermediate electrode CTE that electrically connects the first stage SET1 and the second stage SET2 that may be successively provided. In the case where the first sub-intermediate electrode CTE-1 and the second sub-intermediate electrode CTE-2 are integral with each other, the first sub-intermediate electrode CTE-1 and the second sub-intermediate electrode CTE-2 may be respective different areas of the intermediate electrode CTE.

In the aforementioned embodiment, the first electrode EL1 may be an anode electrode of the emission portion EMU of each pixel PX. The third electrode EL3 may be a cathode electrode of the emission portion EMU.

As described above, in the emission portion EMU of the pixel PX including the light emitting elements LD electrically connected to each other in a serial/parallel combination structure, driving current ID and/or voltage conditions may be readily adjusted in response to specifications of a product to which the emission portion EMU is applied.

Particularly, the emission portion EMU of the pixel PX including the light emitting elements LD electrically connected to each other in a serial/parallel combination structure may be reduced in the driving current ID, compared to that of the emission portion EMU including the light emitting elements LD electrically connected only in parallel to each other.

Although FIG. 2 illustrates the case where the pixel PX (or the emission portion EMU) includes two stages (i.e., the first and second stages SET1 and SET2), the disclosure may not be limited thereto. For example, the pixel PX may include three or more stages which will be described below with reference to FIG. 10.

Figure 3:
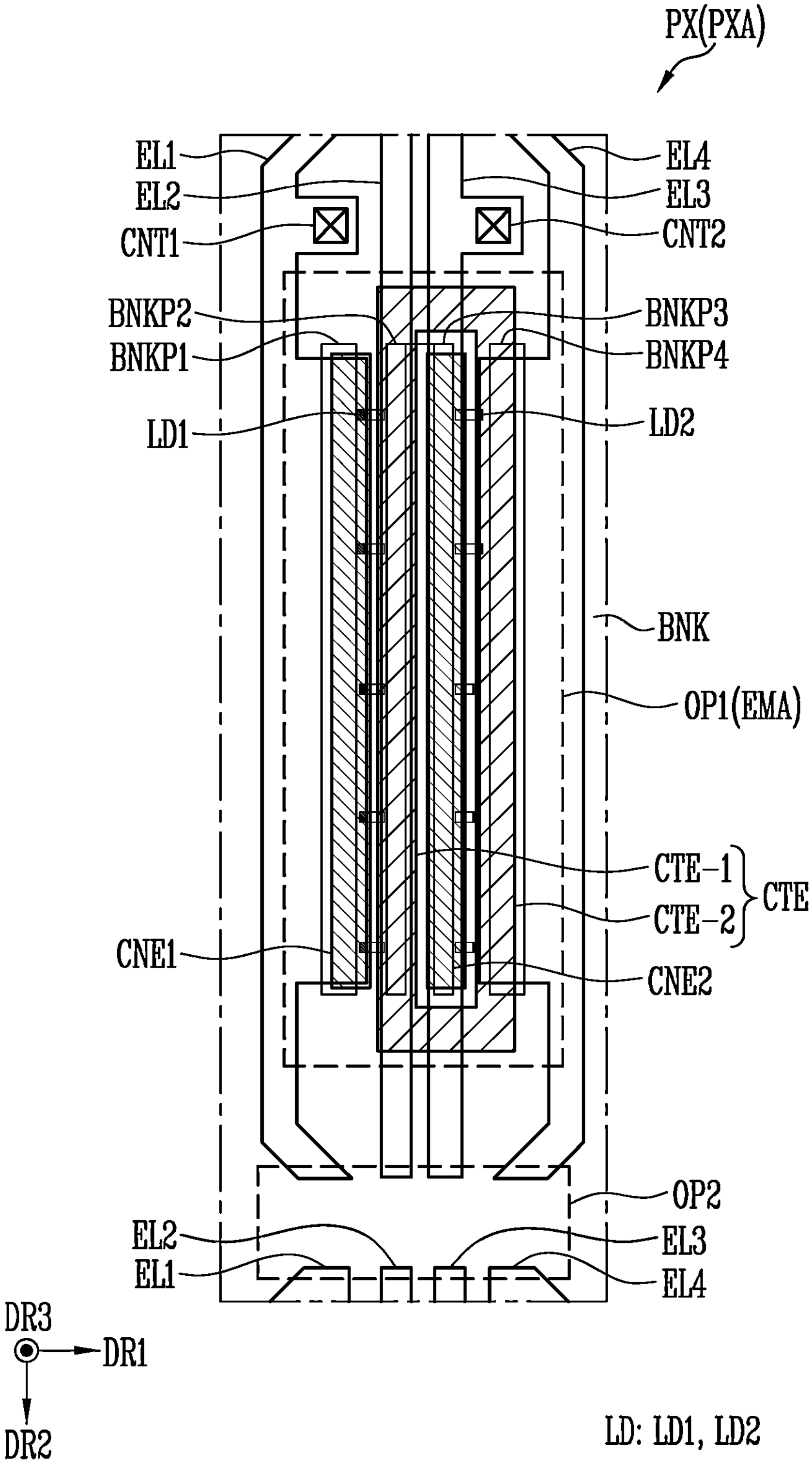
FIG. 3 is a plan view illustrating an embodiment of the pixel of FIG. 2.

FIG. 3 is a plan view illustrating an embodiment of the pixel of FIG. 2. For the sake of convenience in the explanation, the pixel PX may be simply illustrated with a focus on the emission portion EMU excluding the pixel circuit PXC of FIG. 2. The emission portion EMU of the pixel PX included in the display device of FIG. 1, i.e., the emission portion EMU of a normal pixel and the emission portion EMU of a defective pixel, may have the same structure, and may be identical to that of the embodiment of FIG. 3.

Referring to FIGS. 2 and 3, the pixel PX may be formed in a pixel area PXA defined on a substrate. The pixel area PXA may include an emission area EMA. In an embodiment, the pixel PX may include a bank BNK, and may be defined by the bank BNK that encloses the emission area EMA. The bank BNK may include a first opening OP1 and a second opening OP2 through which underlying components may be exposed. The emission area EMA may be defined by the first opening OP1 of the bank BNK.

The first electrode EL1, the second electrode EL2, the third electrode EL3, and the fourth electrode EL4 may be successively arranged in a first direction DR1. Each of the first electrode EL1, the second electrode EL2, the third electrode EL3, and the fourth electrode EL4 may extend in a second direction DR2 crossing the first direction DR1. Ends of the first electrode EL1, the second electrode EL2, the third electrode EL3, and the fourth electrode EL4 may be positioned in the second opening OP2 of the bank BNK. For reference, the first electrode EL1, the second electrode EL2, the third electrode EL3, and the fourth electrode EL4 may extend to adjacent pixel areas before the light emitting elements LD may be supplied onto the substrate during a process of manufacturing the display device, and may be separated from other electrodes (e.g., electrodes of an adjacent pixel in the second direction DR2) in the second opening OP2 after the light emitting elements LD may be supplied and arranged in the pixel area PXA.

The first electrode EL1 may be electrically connected to the first transistor T1 described with reference to FIG. 2 through a first contact hole CNT1. The third electrode EL3 may be electrically connected to the second power line PL2 described with reference to FIG. 2 through a second contact hole CNT2.

In an embodiment, each of the first electrode EL1, the second electrode EL2, the third electrode EL3, and the fourth electrode EL4 may have a single-layer or multilayer structure. For example, the each of the first electrode EL1, the second electrode EL2, the third electrode EL3, and the fourth electrode EL4 may have a multilayer structure including a reflective electrode and a conductive capping layer. Furthermore, the reflective electrode may have a single-layer or multilayer structure. For example, the reflective electrode may include at least one reflective conductive layer, and selectively further include at least one transparent conductive layer disposed over and/or under the reflective conductive layer.

In an embodiment, the pixel PX may include a first bank pattern BNKP1 that overlaps an area of the first electrode EL1, a second bank pattern BNKP2 that overlaps an area of the second electrode EL2, a third bank pattern BNKP3 that overlaps an area of the third electrode EL3, and a fourth bank pattern BNKP4 that overlaps an area of the fourth electrode EL4.

The first bank pattern BNKP1, the second bank pattern BNKP2, the third bank pattern BNKP3, and the fourth bank pattern BNKP4 may be disposed at positions spaced apart from each other in the emission area EMA, and may protrude respective certain areas of the first electrode EL1, the second electrode EL2, the third electrode EL3, and the fourth electrode EL4 upward. For example, the first electrode EL1 (or a protrusion of the first electrode EL1) may be disposed on the first bank pattern BNKP1 and protrude in a third direction DR3 (i.e., a thickness direction of the substrate SUB) by the first bank pattern BNKP1. The second electrode EL2 may be disposed on the second bank pattern BNKP2 and protrude in the third direction DR3 by the second bank pattern BNKP2. The third electrode EL3 may be disposed on the third bank pattern BNKP3 and protrude in the third direction DR3 by the third bank pattern BNKP3. The fourth electrode EL4 (or a protrusion of the fourth electrode EL4) may be disposed on the fourth bank pattern BNKP4 and protrude in the third direction DR3 by the fourth bank pattern BNKP4. The second bank pattern BNKP2 and the third bank pattern BNKP3 may be integral with each other as a single body without being spaced apart from each other.

The first light emitting element LD1 may be disposed between the first electrode EL1 and the second electrode EL2. A first end (or an end) of the first light emitting element LD1 may face the first electrode EL1. A second end (or another end) of the first light emitting element LD1 may face the second electrode EL2. In the case where multiple first light emitting elements LD1 are provided, the first light emitting elements LD1 may be electrically connected in parallel between the first electrode EL1 and the second electrode EL2, thus forming the first stage SET1 described with reference to FIG. 2.

Likewise, the second light emitting element LD2 may be disposed between the third electrode EL3 and the fourth electrode EL4. A first end of the second light emitting element LD2 may face the fourth electrode EL4. A second end of the second light emitting element LD2 may face the third electrode EL3. The second end of the second light emitting element LD2 and the second end of the first light emitting element LD1 may include the same type of semiconductor layer (e.g., p-type semiconductor layer), and may face each other with the second electrode EL2 and the third electrode EL3 disposed therebetween. In the case where multiple second light emitting elements LD2 are provided, the second light emitting elements LD2 may be electrically connected in parallel between the third electrode EL3 and the fourth electrode EL4, thus forming the second stage SET2 described with reference to FIG. 2.

In an embodiment, each of the first light emitting element LD1 and the second light emitting element LD2 may be formed of a light emitting diode which may be made of material having an inorganic crystal structure and has a subminiature size, e.g., ranging from the nano-scale to the micro-scale.

In an embodiment, the light emitting elements LD may be prepared in a diffused form in a certain solution, and supplied to the emission area EMA of the pixel area PXA by an inkjet printing technique or a slit coating technique. For example, the light emitting elements LD may be mixed with a volatile solvent and supplied to the emission area EMA. Here, if a certain voltage may be applied between the first electrode EL1 and the second electrode EL2, as well as between the third electrode EL3 and the fourth electrode EL4, an electric field may be formed between the first electrode EL1 and the second electrode EL2, as well as between the third electrode EL3 and the fourth electrode EL4. As a result, the light emitting elements LD may be self-aligned between the first electrode EL1, the second electrode EL2, as well as between the third electrode EL3 and the fourth electrode EL4. After the light emitting elements LD may be aligned, the solvent may be removed by a volatilization technique or other techniques. In this way, the light emitting elements LD may be reliably aligned between the first electrode EL1 and the second electrode EL2, as well as between the third electrode EL3 and the fourth electrode EL4.

In embodiments, the pixel PXL may include a first contact electrode CNE1, a second contact electrode CNE2, and an intermediate electrode CTE.

The first contact electrode CNE1 may be formed on the first end of the first light emitting element LD1 and at least an area of the first electrode EL1 corresponding to the first end of the first light emitting element LD1, thus physically and/or electrically connecting the first end of the light emitting element LD to the first electrode EL1.

The second contact electrode CNE2 may be formed on the second end of the second light emitting element LD2 and at least an area of the third electrode EL3 corresponding to the second end of the second light emitting element LD2, thus physically and/or electrically connecting the second end EP2 of the second light emitting element LD2 to the third electrode EL3.

The intermediate electrode CTE may include a first sub-intermediate electrode CTE-1 (or a first intermediate electrode) and a second sub-intermediate electrode CTE-2 (or a second intermediate electrode) that may extend in the second direction DR2. The first sub-intermediate electrode CTE-1 may be provided and/or formed on the second end of the first light emitting element LD1 and at least an area of the second electrode EL2 corresponding to the second end of the first light emitting element LD1. The intermediate electrode CTE may extend from the first sub-intermediate electrode CTE-1 to bypass the second contact electrode CNE2 or the second light emitting element LD2. The second sub-intermediate electrode CTE-2 may be formed on the first end of the second light emitting element LD2 and at least an area of the fourth electrode EL4 corresponding to the first end of the second light emitting element LD2. The intermediate electrode CTE may electrically connect the second end of the first light emitting element LD1 to the first end of the second light emitting element LD2.

Figure 4:
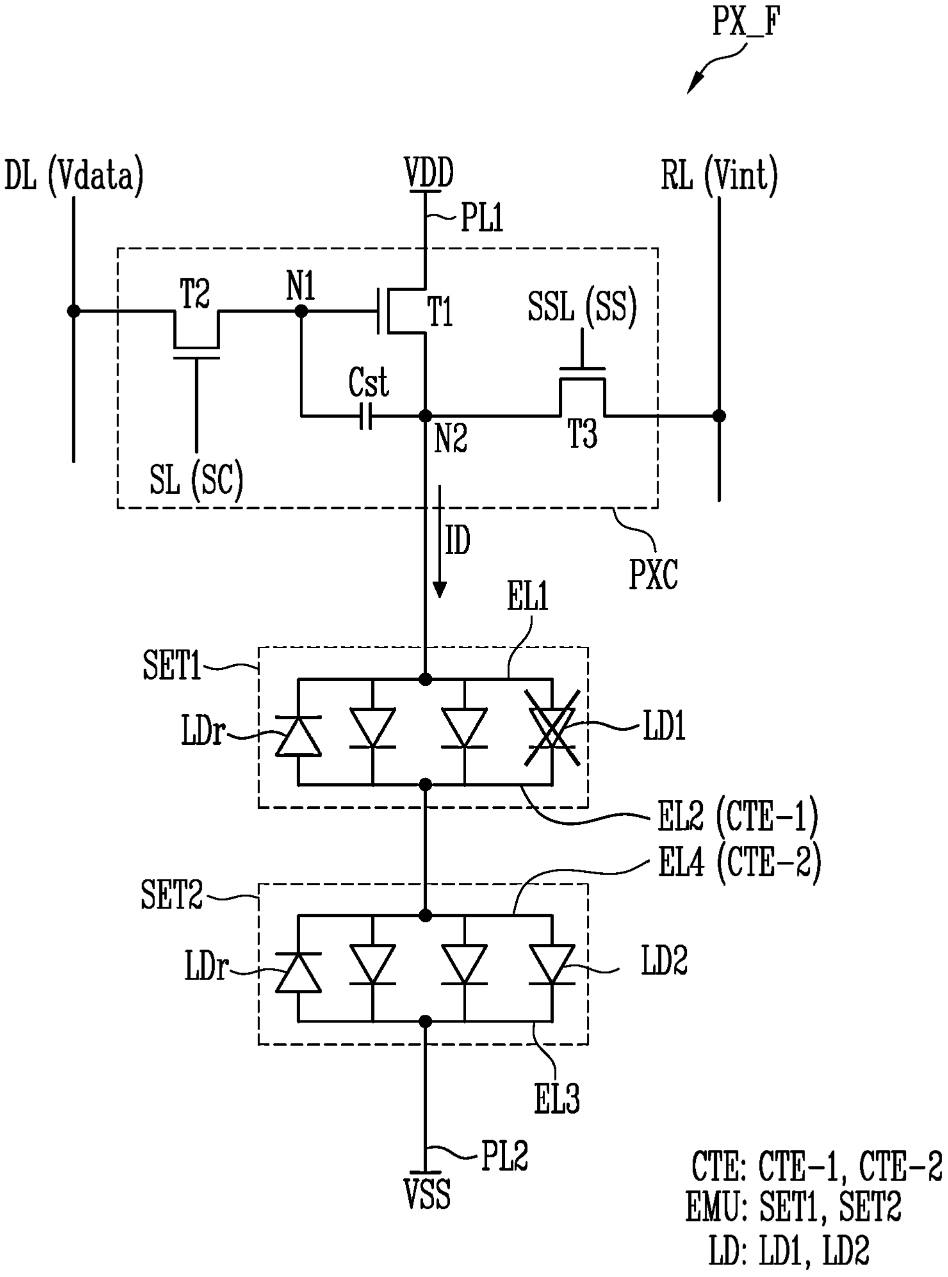
FIG. 4 is a schematic diagram of an equivalent circuit of a pixel included in the display device of FIG. 1.

FIG. 4 is a schematic diagram of an equivalent circuit of a pixel included in the display device of FIG. 1. In FIG. 4, there may be illustrated a schematic diagram of an equivalent circuit of a defective pixel PX_F.

Referring to FIGS. 2 and 4, the defective pixel PX_F other than the fact that a defect may be in the first stage SET1 (or the first light emitting element LD1), may be substantially the same as the pixel PX (or a normal pixel) of FIG. 2. Therefore, repetitive explanation thereof will be omitted. The defect in the first stage SET1 may be illustrative, and for example, a defect may be in the second stage SET2 (or the second light emitting element LD2) in lieu of the first stage SET1.

For example, as shown in FIG. 4, a first light emitting element LE1 with a defect may cause a short-circuit between the first electrode EL1 and the second electrode EL2. Driving current ID flowing between the first electrode EL1 and the second electrode EL2 may flow through the first light emitting element LD1 with the defect, while no current flows through another light emitting elements LD1 that require an operating voltage.

For reference, in the case where a first light emitting element LD1 opens, no current flows through only the corresponding first light emitting element LD1, and current can flow through another first light emitting elements LD1. As a result, the display quality may seldom degrade. As the number of first light emitting elements LD1 increases, the influence of opening of a single first light emitting element LD1 on the first stage SET1 may be reduced. On the other hand, in the case where a first light emitting element LD1 is short-circuited, the first stage SET1 may not operate (or not emit light), the luminance of the pixel PX may be markedly reduced (e.g., to a level corresponding to ½ of the normal luminance). In the case where an identical data signal Vdata is applied to the pixel PX of FIG. 2 and the defective pixel PX_F of FIG. 4, the defective pixel PX_F of FIG. 4 may emit light with a luminance lower than that of the pixel PX of FIG. 2. In the case where the display component 100 (refer to FIG. 1) includes multiple defective pixels PX_F, a luminance deviation may occur, and the display quality may degrade.

Taking into account the aforementioned fact, in an embodiment, degradation in the display quality may be prevented by detecting the defective pixel PX_F and emitting light from the defective pixel PX_F and the normal pixel (or the pixel PX) with a same luminance. For example, for the same grayscale value, a data signal Vdata (or driving current ID) to be applied to the defective pixel PX_F may be increased compared to the normal pixel, thus making the luminance of the defective pixel PX_F identical to the luminance of the normal pixel. However, as the current flowing through the light emitting elements LD increases, the defective pixel PX_F may degrade more rapidly than the normal pixel.

As another example, to overcome the problem of a short-circuit on a first light emitting element LD1 with a defect, the defective pixel PX_F may be repaired by cutting at least one of the first light emitting element LD1 with the defect, and the first electrode EL1, and the second electrode EL2. To take into account the fact that it may be difficult to remove only the first light emitting element LD1 with the defect due to a small size of the light emitting elements LD and, in addition to, enhance efficiency in repair of the defective pixel PX_F, the first electrode EL1 and/or the second electrode EL2 may be partially cut (e.g., halved). The driving current ID may be divided and flow through only some (e.g., half) of the first light emitting elements LD1 of the first stage SET1 of the defective pixel PX_F. In other words, relatively high current may flow through only some (e.g., half) of the first light emitting elements LD1 of the first stage SET1 of the defective pixel PX_F. Even without increasing the data signal Vdata (or the driving current ID), the defective pixel PX_F may emit light at a target luminance. However, the defective pixel PX_F may degrade rapidly due to increased current flowing through each first light emitting element LD1.

As described above, the defective pixel PX_F may have, in one of the stages SET1 and SET2, a short circuit defect or a portion that has been repaired due to a short-circuit defect. The defective pixel PX_F may degrade more rapidly than the normal pixels.

Here, short-circuit defects may be present in all of the stages SET1 and SET2. Because the pixel (or emission portion EMU) may be non-luminous, the pixel may not be considered a target for degradation compensation.

Figure 5:
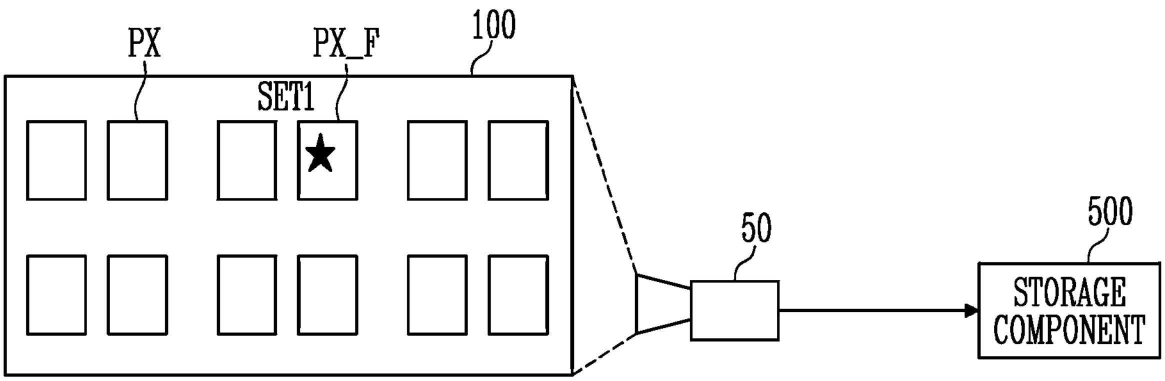
FIG. 5 is a schematic diagram describing a method of detecting a defective pixel in the display device of FIG. 1.

FIG. 5 is a schematic diagram for describing a method of detecting a defective pixel in the display device of FIG. 1.

Referring to FIG. 5, a driving voltage may be applied to the display component 100 (or the display device), so that the pixel PX can emit light. The driving current ID (refer to FIG. 2) may be divided and flow to the light emitting elements LD (refer to FIG. 2) (or the stages) in the pixel PX, whereby the light emitting elements LD may emit light and radiate heat.

The inspection device (or image capturing device) 50 may be positioned at a certain angle to capture an image of an overall area of a front surface of the display component 100.

The inspection device 50 may include a thermo-graphic camera, a charge-coupled device (CCD), and the like. The inspection device 50 may capture an image of the display component 100 (or the display device) to acquire a thermal infrared image or temperature data.

If the temperature in an area corresponding to a specific stage (e.g., the first stage SET1) appears lower in the thermal infrared image (e.g., lower than an average temperature of the entire display component 100), it may be determined that no current flows through the light emitting elements in the corresponding stage, thus indicating occurrence of a defect in the corresponding stage. Furthermore, based on the location of the aforementioned area (i.e., a low temperature area) in the thermal infrared image, the defective stage (i.e., the stage where the defect has occurred) and the defective pixel PX_F including the defective stage may be specified. In other words, location information of the defective pixel PX_F may be acquired.

The location information of the defective pixel PX_F may be provided to the storage component 500. The storage component 500 may store the location information of the defective pixel PX_F.

Figure 6:
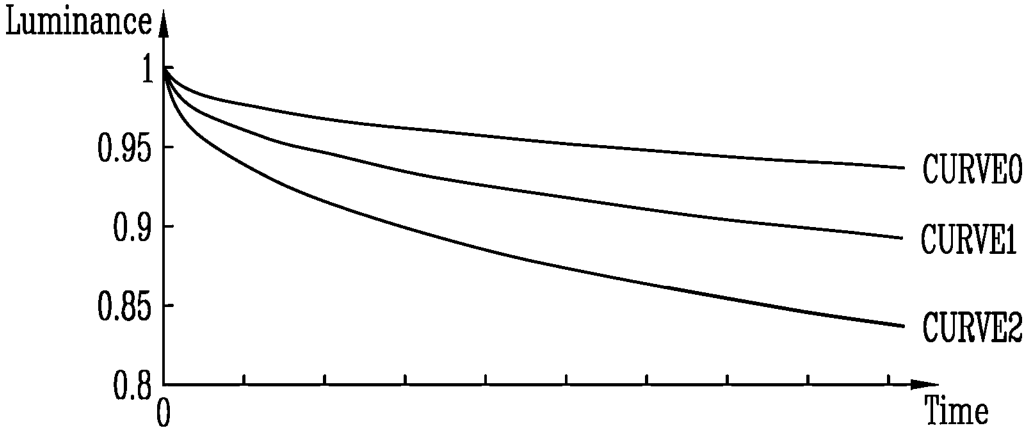
FIG. 6 is a schematic diagram illustrating degradation characteristics of pixels of FIG. 5.

FIG. 6 is a schematic diagram illustrating degradation characteristics of the pixels of FIG. 5. In FIG. 6, there may be illustrated a first degradation curve CURVE1 for the pixel PX (or the normal pixel) and a second degradation curve CURVE2 for the defective pixel PX_F. Each of the first and second degradation curves CURVE1 and CURVE2 illustrates variation in luminance (or a luminance reduction rate) as a function of the driving time (or accumulated driving time).

Referring to FIGS. 5 and 6, the luminance of the display component 100 (or the display device) may be periodically measured by the inspection device 50 while the display component 100 may be driven during a reference time. In other words, experimentally, the first degradation curve CURVE1 and the second degradation curve CURVE2 may be acquired.

The first degradation coefficient may be calculated or acquired based on the first degradation curve CURVE1 and Equation 1. The first degradation coefficient may correspond to a slope of the first degradation curve CURVE1. Likewise, the second degradation coefficient may be acquired based on the second degradation curve CURVE2 and Equation 1. The second degradation coefficient may correspond to a slope of the second degradation curve CURVE2, and may be greater than the first degradation coefficient.

The compensation component 600 (refer to FIG. 1) may calculate the first degradation curve CURVE1 based on the first degradation coefficient, in other words, calculate a luminance degraded during a specific driving time, and may compensate for the grayscale value of the pixel PX based on a difference between a target luminance according to the reference curve CURVE0 and the degraded luminance (i.e., based on a luminance deficiency). Likewise, the compensation component 600 may calculate the second degradation curve CURVE2 based on the second degradation coefficient, in other words, calculate a luminance degraded during a specific driving time, and may compensate for the grayscale value of the pixel PX_F based on a difference between a target luminance according to the reference curve CURVE0 and the degraded luminance (i.e., based on a luminance deficiency).

In an embodiment, each of the first degradation coefficient and the second degradation coefficient may include a grayscale coefficient, a temperature coefficient, a frequency coefficient, and an emission duty coefficient that respectively represent a grayscale value, a driving temperature, a driving frequency, and a change in luminance according to the emission duty of the pixel. The grayscale coefficient, the temperature coefficient, the frequency coefficient, and the emission duty coefficient that may be included in the second degradation coefficient may be respectively different from the grayscale coefficient, the temperature coefficient, the frequency coefficient, and the emission duty coefficient that may be included in the first degradation coefficient. However, the disclosure may not be limited to the aforementioned example.

For example, the degradation curve representing the luminance of the pixel that degrades based on the driving time, grayscale value, driving temperature, driving frequency, and emission duty of the pixel can be defined by the following equation 2.

$$L(G,T,F,D)=\exp\left[-\left(\frac{G}{\tau 1}\right)^{\beta 1}\right]\times\exp\left[-\left(\frac{T}{\tau 2}\right)^{\beta 2}\right]\times\exp\left[-\left(\frac{F}{\tau 3}\right)^{\beta 3}\right]\times\exp\left[-\left(\frac{D}{\tau 4}\right)^{\beta 4}\right]$$ [Equation 2]

Here, L may denote a reduced luminance (or estimated luminance), which, for example, may be a ratio of the reduced luminance to an initial maximum luminance of the pixel (normal pixel or defective pixel). G may denote a grayscale value for the pixel, T may denote a driving temperature, F may denote a driving frequency, and D may denote an emission duty. Symbols τ1 and β1 may denote grayscale coefficients, τ2 and β2 may denote temperature coefficients, τ3 and β3 may denote frequency coefficients, and τ4 and β4 may denote emission duty coefficients.

For example, in a state in which the grayscale value of the pixel may be changed or the grayscale value of each pixel may be set to a different value, the grayscale coefficient may be acquired by measuring the luminance of the display component 100 using the inspection device 50 or performing experiments. Likewise, the temperature coefficient may be acquired by performing experiments in a state in which the driving temperature of the display component 100 (or the display device) may be changed or the driving temperature for each display component 100 may be set to a different value. The frequency coefficient may be acquired by performing experiments in a state in which the driving frequency of the display component 100 (or the display device) may be changed or the driving temperature for each display component 100 may be set to a different value. The emission duty coefficient may be acquired by performing experiments in a state in which the emission duty of the pixel may be changed or the emission duty for each pixel may be set to a different value.

The compensation component 600 (refer to FIG. 1) may compensate for the grayscale value of the pixel (the normal pixel or the defective pixel), taking into account the grayscale coefficient, the temperature coefficient, the frequency coefficient, and the emission duty coefficient.

FIGS. 7 and 8 are schematic diagrams illustrating an example of a lookup table including information about a defective pixel.

Referring to FIGS. 1, 7, and 8, the information about the defective pixel may be stored in the storage component 500 in the form of a lookup table.

In an embodiment, the lookup table LUT may include defect information for each pixel.

Referring to FIG. 7, for example, first information INFO_P1 may indicate whether there may be a defect in the pixel positioned on a first row and a first column. A value of 0 may indicate that there may be no defect. Second information INFO_P2 may indicate whether there may be a defect in the pixel positioned on the first row and a second column. A value of 1 may indicate that there may be a defect in a stage. In this way, the lookup table LUT may include defect information for each pixel.

In embodiments, the lookup table LUT may include location information of defective pixels for specific areas of the display component 100.

In an embodiment, the lookup table LUT may include location information indicating a row where a defective pixel may be positioned, on a column basis. As an example, with reference to FIG. 8, first location information INFO_S1 may indicate a row where a defective pixel may be positioned among pixels positioned on the first column. Second location information INFO_S2 may indicate a row where a defective pixel may be positioned among pixels positioned on the second column. For example, a value of A may indicate that a defective pixel may be positioned on an A-th row. A value of B may indicate that a defective pixel may be positioned on a B-th row. Here, a value of 0 may indicate that there may be no defective pixel. Compared to the lookup table LUT of FIG. 7, unnecessary information (e.g., information about the normal pixels) may be reduced in the lookup table LUT of FIG. 8. Therefore, the capacity of the storage component 500 provided to store the lookup table LUT may be reduced.

In an embodiment, the lookup table LUT may include location information indicating a column where a defective pixel may be positioned, on a row basis. As an example, with reference to FIG. 8, the first location information INFO_S1 may indicate a column where a defective pixel may be positioned among pixels positioned on the first row. In the case where the number of rows is less than the number of columns, the size of the lookup table LUT and the capacity of the storage component 500 may be reduced.

In an embodiment, the lookup table LUT may include location information of defective pixels, on a block basis. Each block may include pixels of M rows×N columns. The size of the block may be set based on the frequency of occurrence of defective pixels. Each of M and N may be an integer of 1 or more. For example, in the case where a defective pixel occurs in approximately every 2000 pixels (or 40×50 pixels) on average, the block may have a size of 40 rows×50 columns. As an example, with reference to FIG. 8, the first location information INFO_S1 may indicate a location of a defective pixel in a first block. Since the block may be set based on the frequency of occurrence of a defective pixel, the size of the lookup table LUT and the capacity of the storage component 500 may be minimized.

Although the lookup table LUT of FIG. 8 has been described as including only location information of a defective pixel (e.g., excluding location information of the normal pixels and information about the number of defective stages), the disclosure may not be limited thereto. For example, the lookup table LUT may further include information about the number of defective stages in the defective pixel. As an example with reference to FIG. 8, a value inside a parenthesis may represent the number of defective stages, where a value of 1 inside the parenthesis indicates that the defective pixel includes a defective stage, and a value of 2 inside the parenthesis indicates that the defective pixel includes two defective stages.

Figure 9:
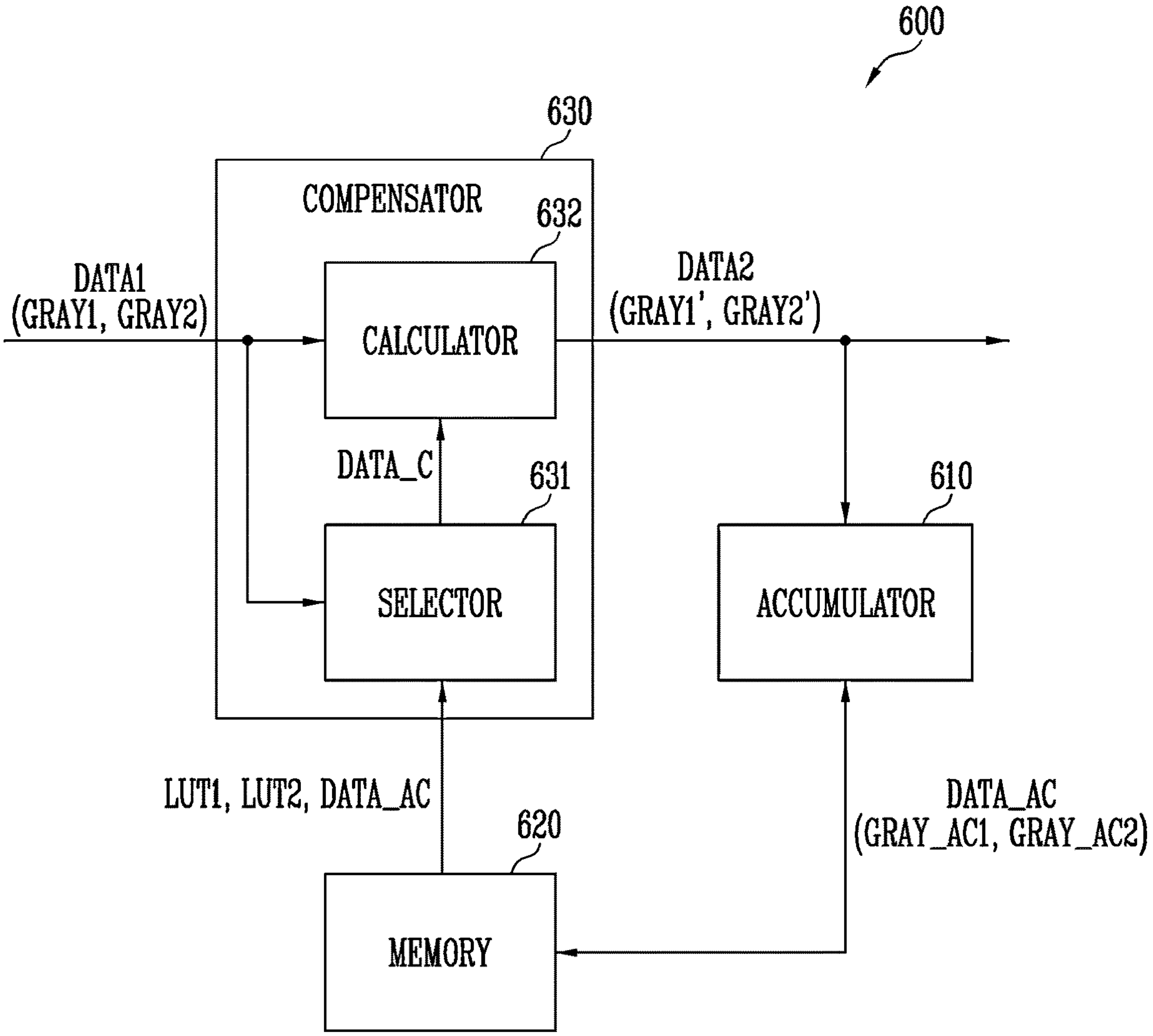
FIG. 9 is a schematic block diagram illustrating an embodiment of a compensation component included in the display device of FIG. 1.

FIG. 9 is a schematic block diagram illustrating an embodiment of a compensation component included in the display device of FIG. 1.

Referring to FIGS. 1 and 9, the compensation component 600 may include an accumulator (or accumulation circuit, stress calculator, driving time calculator) 610, a memory (or memory device, storage circuit) 620, and a compensator (or compensation circuit) 630.

The accumulator 610 may calculate the driving time (or accumulated driving time, accumulated stress) of each pixel PX based on the compensated data DATA2.

For example, the accumulator 610 may accumulate a first compensated grayscale value (or first converted grayscale value) GRAY1' in the compensated data DATA2 to calculate a first driving time of a normal pixel, and accumulate a second compensated grayscale value (or second converted grayscale value) GRAY2' in the compensated data DATA2 to calculate a second driving time of a defective pixel. Here, the first compensated grayscale value GRAY" may be a grayscale value acquired by converting a first grayscale value GRAY1 corresponding to a first pixel through degradation compensation. Likewise, the second compensated grayscale value GRAY" may be a grayscale value acquired by converting a second grayscale value GRAY2 corresponding to a second pixel through degradation compensation.

For example, the accumulator 610 may accumulate the first compensated grayscale value GRAY1' per frame, or average and downscale the first compensated grayscale values GRAY1' output during a specific time, thus calculating the first driving time for normal pixels. The accumulator 610 may sum the first driving time to a first accumulated grayscale value GRAY_AC1, or update the first accumulated grayscale value GRAY_AC1 based on the first driving time. Here, the first accumulated grayscale value GRAY_AC1 may be included in accumulated data DATA_AC (or driving time data). The accumulated data DATA_AC may be stored and updated in the memory 620 to be described below.

Likewise, the accumulator 610 may calculate a second driving time for a second pixel, and update a second accumulated grayscale value GRAY_AC2. The second accumulated grayscale value GRAY_AC2 may be included in the accumulated data DATA_AC and stored and updated in the memory 620.

The memory 620 may store the accumulated data DATA_AC, provide the accumulated data DATA_AC to the accumulator 610 in response to a request of the accumulator 610 (i.e., a request for providing the accumulated data DATA_AC), and update the accumulated data DATA_AC in real-time or periodically.

Furthermore, the memory 620 may store degradation coefficients or lookup tables LUT1 and LUT2 corresponding thereto. The first lookup table LUT1, as shown in Table 1 below, may include compensated grayscale values or degradation compensation ratios corresponding to driving times of the normal pixel, based on the first degradation coefficient of the normal pixel (e.g., the first degradation curve CURVE1 described with reference to FIG. 6).

TABLE 1

| Classification | 0 | t1 | t2 |
|---|---|---|---|
| . . . | . . . | . . . | . . . |
| GRAY1_L1 | GRAY1_L1 | GRAY1_L" (GRAY1_L1 + GRAY1_D1) | GRAY1_L''' (GRAY1_L1 + GRAY1_D2) |
| . . . | . . . | . . . | . . . |

Table 1 represents an example of the first lookup table LUT1.

In an embodiment, the first lookup table LUT1 may include compensated grayscale values GRAY1_L" and GRAY1_''' according to driving times t1 and t2, in response to a first input grayscale value GRAY1_L1.

In an embodiment, the first lookup table LUT1 may include grayscale compensation values (or compensation grayscale values) GRAY1_D1 and GRAY1_D2, in lieu of the compensated grayscale values GRAY1_L" and GRAY1_'''. Here, the grayscale compensation values GRAY1_D1 and GRAY1_D2 may be differences between the first input grayscale value GRAY1_L1 and the compensated grayscale values GRAY1_L" and GRAY1_L''' according to the driving times t1 and t2.

Likewise, the second lookup table LUT2 may include compensated grayscale values or degradation compensation ratios corresponding to driving times of a defective pixel, based on the second degradation coefficient of the defective pixel (e.g., the second degradation curve CURVE2 described with reference to FIG. 6). Based on the second degradation coefficient of the defective pixel (i.e., the second degradation curve CURVE2), the compensated grayscale values of the defective pixel may be respectively greater than the compensated grayscale values of the normal pixel according to the same driving time.

Although the degradation coefficients or the lookup tables LUT1 and LUT2 corresponding thereto have been described as being stored in the memory 620, the disclosure may not be limited thereto. For example, the degradation coefficients or the lookup tables LUT1 and LUT2 corresponding thereto may be stored in the storage component 500, and may be loaded from the storage component 500 on the memory 620 in case that the display device is turned on.

The memory 620 may be implemented using a nonvolatile memory device such as a dynamic random access memory (DRAM), a static random access memory (SRAM), or the like.

The memory 620 may provide the lookup tables LUT1 and LUT2 to the compensator 630 in response to a request from the compensator 630. The memory 620 may provide the accumulated data DATA_AC to the compensator 630 in response to the request from the compensator 630.

The compensator 630 may compensate for the image data DATA1 based on the accumulated data DATA_AC and lookup tables LUT1 and LUT2 (or the degradation coefficients), thus generating the compensated data DATA2.

For example, the compensator 630 may compensate for the first grayscale value GRAY1 (i.e., the grayscale value for the normal pixel), based on the first accumulated grayscale value GRAY_AC1 and the first lookup table LUT1 (or the first degradation coefficient), thus producing the first compensated grayscale value GRAY1'. Likewise, the compensator 630 may compensate for the second grayscale value GRAY2 (i.e., the grayscale value for the defective pixel), based on the second accumulated grayscale value GRAY_AC2 and the second lookup table LUT2 (or the second degradation coefficient), thus producing the second compensated grayscale value GRAY2'.

In embodiments, the compensator 630 may include a selector 631 and a calculator 632.

The selector 631 may generate compensation data DATA_C corresponding to the image data DATA1, based on the accumulated data DATA_AC and the lookup tables LUT1 and LUT2 (or the degradation coefficients).

For example, the selector 631 may select the second lookup table LUT2 (or the second degradation coefficient) based on the location information of the defective pixel, and acquire a second grayscale compensation value based on the second grayscale value GRAY2, the second driving time (or the second accumulated grayscale value GRAY_AC2), and the second lookup table LUT2 (or the second degradation coefficient). With regard to the normal pixel with no separate location information, the selector 631 may select the first lookup table LUT1 (or the first degradation coefficient), and acquire a first grayscale compensation value based on the first grayscale value GRAY1, the first driving time (or the first accumulated grayscale value GRAY_AC1), and the first lookup table LUT1 (or the first degradation coefficient). In other words, the selector 631 may select one of the lookup tables LUT1 and LUT2 (or the degradation coefficients), based on the location information of the defective pixel (e.g., information in the lookup table LUT of FIG. 7 or 8).

The calculator 632 may perform operation of adding the compensation data DATA_C to the image data DATA1, thus generating the compensated data DATA2. For example, the calculator 632 may calculate the first compensated grayscale value GRAY1' by adding the first grayscale compensation value to the first grayscale value GRAY1, and calculate the second compensated grayscale value GRAY2' by adding the second grayscale compensation value to the second grayscale value GRAY2.

As described above, the compensator 630 may use the first lookup table LUT1 to compensate for the first grayscale value GRAY1 for the normal pixel, and use the second lookup table LUT2 to compensate for the second grayscale value GRAY2 for the defective pixel.

Figure 10:
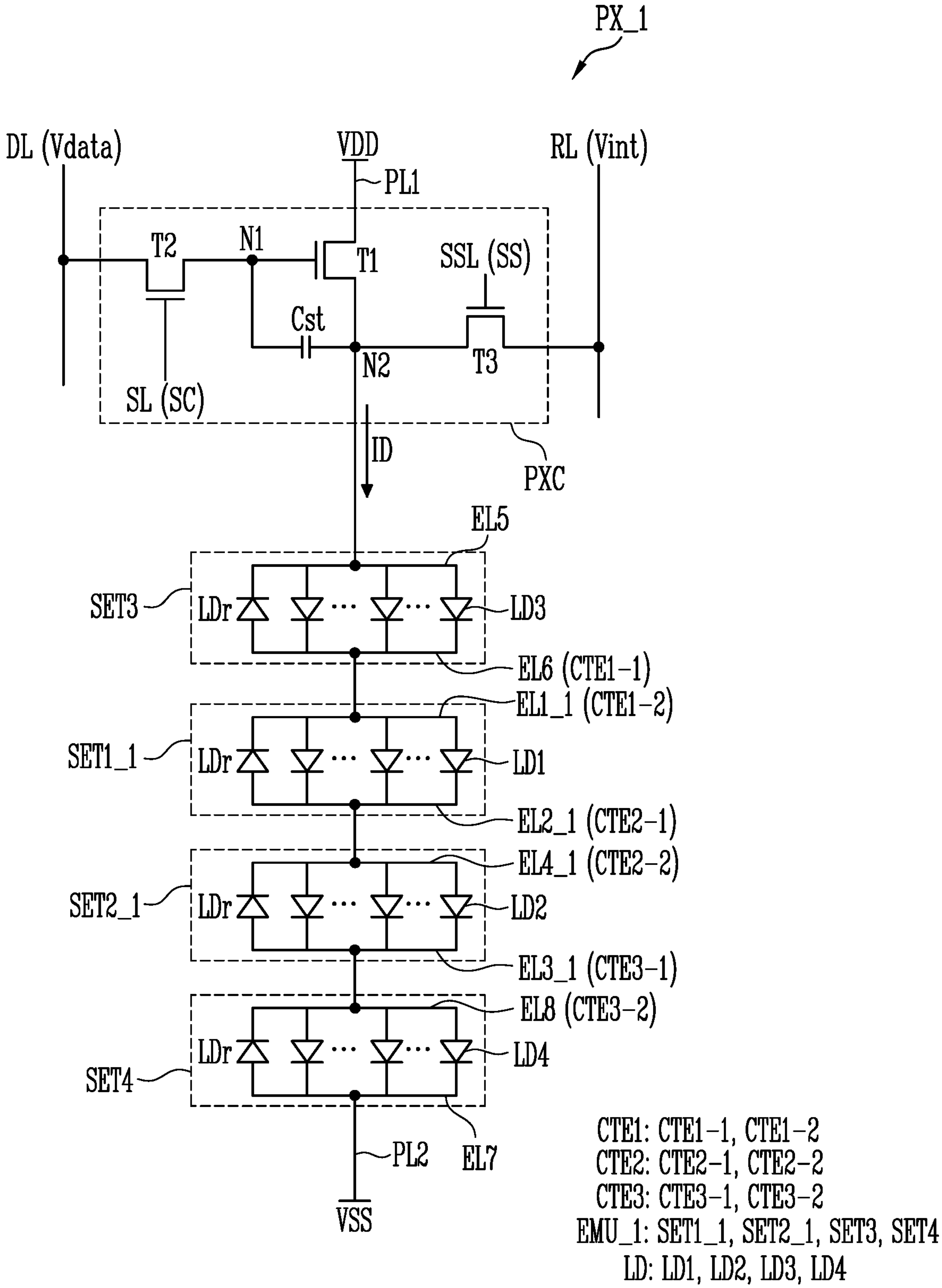
FIG. 10 is a schematic diagram of an equivalent circuit of a pixel included in the display device of FIG. 1.

FIG. 10 is a schematic diagram of an equivalent circuit of a pixel included in the display device of FIG. 1.

Referring to FIGS. 1, 9, and 10, a pixel PX_1 may include an emission portion EMU_1 and a pixel circuit PXC. Since the pixel circuit PXC has been described with reference to FIG. 2, redundant explanation thereof will be omitted.

The emission portion EMU_1 may include a third stage SET3 (or a third sub-emission portion, a third element group), a first stage SET1_1, a second stage SET2_1, and a fourth stage SET4 (or a fourth sub-emission portion, a fourth element group) that may be successively electrically connected between the first and second power lines PL1 and PL2. The emission portion EMU_1 may include first to eighth electrodes EL1_1 to EL8. Each of the first to fourth stages SET1_1 to SET4 may include multiple light emitting elements LD electrically connected in parallel in the same direction between two electrodes among the first to eighth electrodes EL1_1 to EL8.

The first stage SET1_1 and the second stage SET2_1 may be respectively substantially identical or similar to the first stage SET1 and the second stage SET2 described with reference to FIG. 2.

The first stage SET1_1 may include the first electrode EL1_1 (or a 1-2-th intermediate electrode CTE1-2) and the second electrode EL2_1 (or a 2-1-th intermediate electrode CTE2-1), and may include at least one first light emitting element LD1 electrically connected between the first electrode EL1_1 (or the 1-2-th intermediate electrode CTE1-2) and the second electrode EL2_1 (or the 2-1-th intermediate electrode CTE2-1).

The second stage SET2_1 may include the fourth electrode EL4_1 (or a 2-2-th intermediate electrode CTE2-2) and the third electrode EL3_1 (or a 3-1-th intermediate electrode CTE3-1), and may include at least one second light emitting element LD2 electrically connected between the fourth electrode EL4_1 (or the 2-2-th intermediate electrode CTE2-2) and the third electrode EL3_1 (or the 3-1-th intermediate electrode CTE3-1).

The third stage SET3 may include the fifth electrode EL5 and the sixth electrode EL6 (or a 1-1-th intermediate electrode CET1-1), and may include at least one third light emitting element LD3 electrically connected between the fifth electrode EL5 and the sixth electrode EL6 (or the 1-1-th intermediate electrode CET1-1).

The fourth stage SET4 may include the eighth electrode EL8 (or a 3-2-th intermediate electrode CTE3-2) and the seventh electrode EL7, and may include at least one fourth light emitting element LD4 electrically connected between the eighth electrode EL8 (or the 3-2-th intermediate electrode CTE3-2) and the seventh electrode EL7.

The 1-1-th intermediate electrode CTE1-1 and the 1-2-th intermediate electrode CTE1-2 may form a first intermediate electrode CTE1. Likewise, the 2-1-th intermediate electrode CTE2-1 and the 2-2-th intermediate electrode CTE2-2 may form a second intermediate electrode CTE2. The 3-1-th intermediate electrode CTE3-1 and the 3-2-th intermediate electrode CTE3-2 may form a third intermediate electrode CTE3.

In the aforementioned embodiment, the fifth electrode EL5 may be an anode electrode of the emission portion EMU_1 of the pixel PX_1. The seventh electrode EL7 may be a cathode electrode of the emission portion EMU_1.

In the case where the pixel PX_1 includes four stages SET1_1 to SET4, defective pixels may be classified into three types. For example, the defective pixels may be classified into a first defective pixel including a single defective stage, a second defective pixel including two defective stages, and a third defective pixel including three defective stages. As described with reference to FIG. 8, the storage component 500 (or the lookup table LUT) may store (or include) location information of each defective pixel and information about the number of defective stages in the defective pixel. According to the method described with reference to FIGS. 5 and 6, a degradation curve of each of the first to third defective pixels may be experimentally acquired. A degradation coefficient of each of the first to third defective pixels (or a lookup table including a compensated grayscale value corresponding to the degradation coefficient) may be acquired based on the degradation curve. The degradation coefficient of each of the first to third defective pixels may be stored in the storage component 500. The compensation component 600 (refer to FIG. 1) may compensate for grayscale values of the first to third defective pixels, based on different degradation coefficients (e.g., second, third, and fourth degradation coefficients different from each other). For example, the compensation component 600 may compensate for the grayscale value of the first defective pixel based on the second degradation coefficient, compensate for the grayscale value of the second defective pixel based on the third degradation coefficient, and compensate for the grayscale value of the third defective pixel based on the fourth degradation coefficient.

Figure 11:
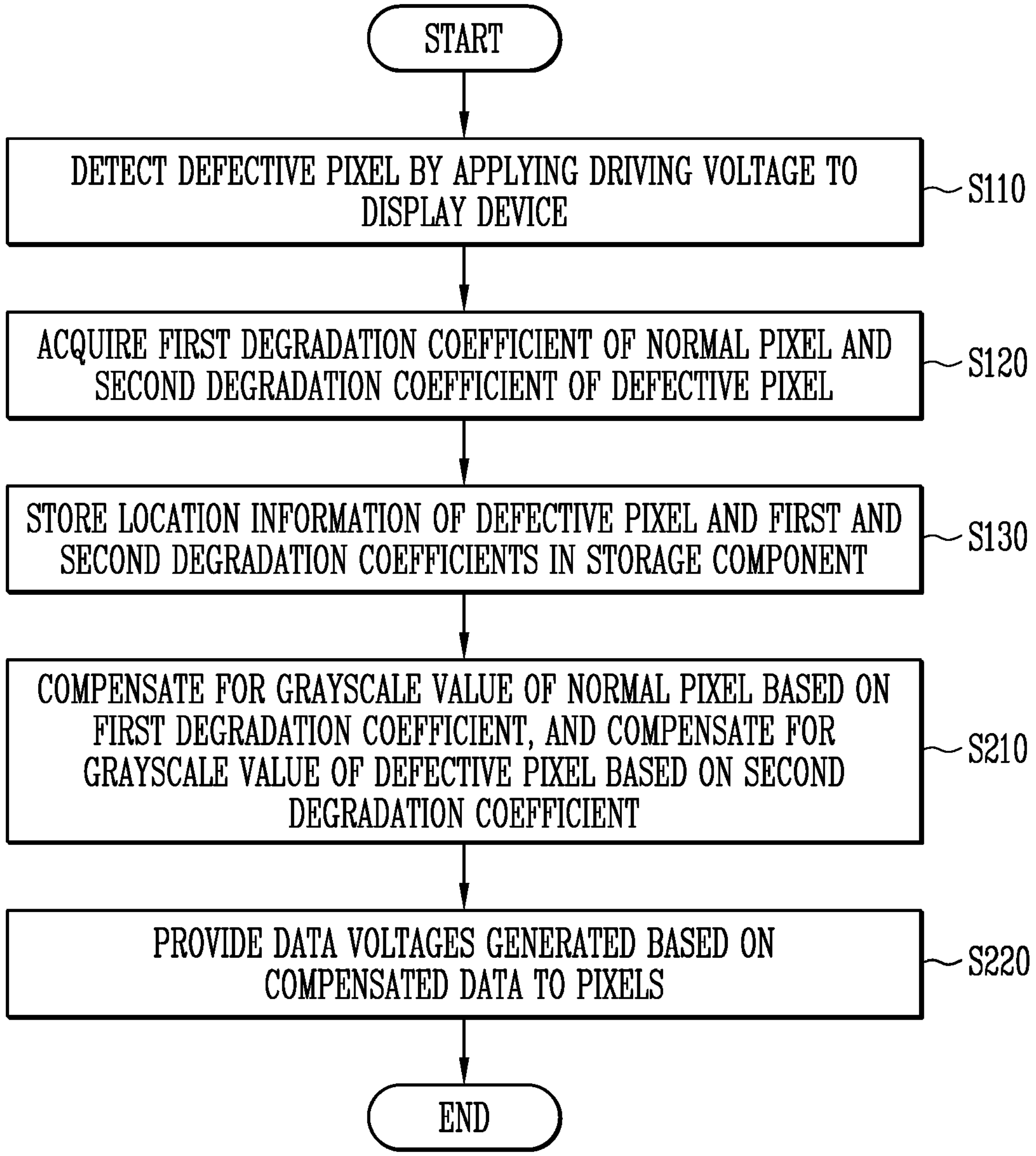
FIG. 11 is a flowchart illustrating a method of driving the display device in accordance with an embodiment.

FIG. 11 is a flowchart illustrating a method of driving the display device in accordance with an embodiment. The method in FIG. 11 may be performed for the display device of FIG. 1. As described with reference to FIGS. 2 and 10, the pixel PX (PX_1) may include the stages SET1 and SET2 (SET1_1 to SET4). Each of the stages SET1 and SET2 (SET1_1 to SET4) may include light emitting elements.

Referring to FIGS. 1, 5, and 11, the method in FIG. 11 may include step S110 of detecting a defective pixel by applying a driving voltage to the display device (or the display component 100). Here, the defective pixel may have, in at least one of the stages, a short-circuit defect or a portion that has been repaired due to a short-circuit defect.

As described with reference to FIG. 5, the method in FIG. 11 may include acquiring a thermal infrared image by capturing an image of the display device using the inspection device 50, detecting a defective stage from the thermal infrared image, and acquiring location information of the defective pixel based on the defective stage.

In an embodiment, in the case where the pixel includes only two stages (e.g., the pixel PX in FIG. 2), the method in FIG. 11 may include acquiring only the location information of the defective pixel without acquiring the location information of a normal pixel and information about the number of defective stages. By doing so, the capacity of the storage component 500 may be reduced.

In an embodiment, in the case where the pixel includes three or more stages (e.g., the pixel PX_1 of FIG. 10), the method in FIG. 11 may further include acquiring information about the number of defective stages as well as including the location information of the defective pixel. For example, the location information of the first defective pixel and the information about the number of defective stages (e.g., one), and the location information of the second defective pixel and the information about the number of defective stages (e.g., two) may be acquired.

Thereafter, the method in FIG. 11 may include step S120 of driving the display device for a reference time, and acquiring a first degradation coefficient of the normal pixel and a second degradation coefficient of the defective pixel. In the method in FIG. 11, the luminance of the display device may be periodically measured by the inspection device 50 while the display device may be driven for the reference time. The first degradation curve CURVE1 and the second degradation curve CURVE2 of FIG. 6 may be acquired based on the measured luminance. Furthermore, in the method in FIG. 11, the first degradation coefficient may be acquired based on the first degradation curve CURVE1 of FIG. 6 and Equation 1. The second degradation coefficient may be acquired based on the second degradation curve CURVE2 of FIG. 6 and Equation 1.

In an embodiment, each of the first and second degradation coefficients may include a grayscale coefficient, a temperature coefficient, a frequency coefficient, and an emission duty coefficient that respectively represent a grayscale value, a driving temperature, a driving frequency, and a change in luminance according to the emission duty of the pixels.

For example, in the method of FIG. 11, in a state in which the grayscale value of the pixel may be changed or grayscale values of the pixels may be set to different values, the grayscale coefficient may be acquired by measuring the luminance of the display component 100 using the inspection device 50 or performing experiments. For example, in the method in FIG. 11, the temperature coefficient may be acquired by performing experiments in a state in which the driving temperature of the display device may be changed or the driving temperature for each display device may be set to a different value. For example, in the method in FIG. 11, the frequency coefficient may be acquired by performing experiments in a state in which the driving frequency of the display device may be changed or the driving frequency for each display device may be set to a different value. For example, in the method in FIG. 11, the emission duty coefficient may be acquired by performing experiments in a state in which the emission duty of the pixel may be changed or the emission duty for each pixel may be set to a different value.

The method in FIG. 11 may include step S130 of storing the location information of the defective pixel and the first and second degradation coefficients in the storage component 500 of the display device. As described with reference to FIG. 8, the location information of the defective pixel may be stored in the storage component 500 in the form of the lookup table LUT. In the case where the information about the number of defective stages in the defective pixel is additionally acquired, the information about the number of defective stages along with the location information of the corresponding defective pixel may be stored in the storage component 500. Here, in lieu of the first and second degradation coefficients, the lookup tables LUT1 and LUT2 (refer to FIG. 9) corresponding to the first and second degradation coefficients may be stored in the storage component 500.

The method in FIG. 11 may include step S210 of compensating for the grayscale value of the normal pixel based on the first degradation coefficient and compensating for the grayscale value of the defective pixel based on the second degradation coefficient different from the first degradation coefficient, thus generating the compensated data DATA2 (refer to FIG. 1).

In an embodiment, in the case where multiple degradation coefficients corresponding to the number of defective stages are set, for example, in the case where the second degradation coefficient for the first defective pixel including a single defective stage, the third degradation coefficient for the second defective pixel including two defective stages, and the like may be set, the method in FIG. 11 may include compensating for the grayscale value of the first defective pixel using the second degradation coefficient, and compensating for the grayscale value of the second defective pixel using the third degradation coefficient different from the second degradation coefficient.

The method in FIG. 11 may include step S220 of generating a data signal (or a data voltage) based on the compensated data DATA2, and providing the data signal to the pixel. As described with reference to FIG. 1, in the method of FIG. 11, the data signal may be generated using the data driver 300.

In a display device and a method of driving the display device in accordance with embodiments of the disclosure, a grayscale value for a normal pixel may be compensated for based on a first degradation coefficient, and a grayscale value for a defective pixel may be compensated for based on a second degradation coefficient different from the first degradation coefficient. Therefore, the degradation of the defective pixel may be more accurately compensated for, whereby the display quality can be enhanced.

The effects of the disclosure may not be limited by the foregoing, and other various effects are anticipated herein.

While various embodiments have been described above, those skilled in the art will appreciate that various modifications, additions and substitutions are possible, without departing from the scope and spirit of the disclosure.

Therefore, the embodiments disclosed in this specification are only for illustrative purposes rather than limiting the technical spirit of the disclosure. The scope of the disclosure must be defined by the accompanying claims.

What is claimed is:

1. A display device, comprising:

a display panel including a plurality of pixels, each of the plurality of pixels including a plurality of stages electrically connected in series, each of the plurality of stages including a plurality of light emitting elements;

a storage component that stores location information of at least one defective pixel having a defect in the plurality of stages among the plurality of pixels;

a compensation component that generates compensated data by compensating for a grayscale value in image data of a normal pixel among the plurality of pixels based on a first degradation coefficient, and by compensating for a grayscale value of the at least one defective pixel corresponding to the location information based on a second degradation coefficient different from the first degradation coefficient; and a data driver that generates data voltages based on the compensated data, and provide the data voltages to the plurality of pixels, wherein the compensation component generates the compensated data by:

calculating a first compensated grayscale value of the normal pixel among the plurality of pixels based on the first degradation coefficient and adding the first compensated grayscale value to the grayscale value in the image data of the normal pixel to compensate for the grayscale value of the normal pixel based on a difference between a target luminance and a first degraded luminance; and calculating a second compensated grayscale value of the at least one defective pixel corresponding to the location information based on the second degradation coefficient different from the first degradation coefficient and adding the second compensated grayscale value to the grayscale value in the image data of the at least one defective pixel to compensate for the grayscale value of the at least one defective pixel based on a difference between the target luminance and a second degraded luminance.

2. The display device according to claim 1, wherein each of the first degradation coefficient and the second degradation coefficient comprises a coefficient in an equation defining a luminance of a corresponding pixel that degrades based on a driving time of the corresponding pixel, and a change in the luminance increases as the coefficient increases.

3. The display device according to claim 2, wherein the second degradation coefficient of the at least one defective pixel is greater than the first degradation coefficient of the normal pixel.

4. The display device according to claim 2, wherein each of the first degradation coefficient and the second degradation coefficient includes a grayscale coefficient, a temperature coefficient, a frequency coefficient, and an emission duty coefficient that respectively represent a grayscale value, a driving temperature, a driving frequency, and a change in the luminance according to an emission duty of the plurality of pixels.

5. The display device according to claim 1, wherein each of the plurality of pixels further includes an identical pixel circuit that provides driving current to the plurality of stages, a number of stages included in the plurality of stages for each of the plurality of pixels are identical to each other, and each of the plurality of light emitting elements of each of the plurality of pixels have an identical size and emit light of an identical color.

6. The display device according to claim 1, wherein a stage of the plurality of stages of the at least one defective pixel has a short-circuit defect or a portion that has been repaired due to the short-circuit defect, and at least one of the plurality of light emitting elements in the stage that includes the short-circuit defect do not emit light, and the plurality of light emitting elements in each of another ones of the plurality of stages in the at least one defective pixel also emit light.

7. The display device according to claim 1, wherein each of the plurality of pixels is composed of two stages, and the storage component is absent of information of the normal pixel and is absent of information about a number of defective stages in each of the at least one defective pixel.

8. The display device according to claim 1, wherein each of the plurality of pixels includes at least three stages, the at least one defective pixel includes a first defective pixel that is composed of one defective stage having at least one defective light emitting element, and a second defective pixel that is composed of two defective stages that each include at least one defective light emitting element, and the storage component stores location information of each of the first and the second defective pixels and information about a number of defective stages within each of the first and the second defective pixels.

9. The display device according to claim 8, wherein the compensation component compensates for the grayscale value of the first defective pixel based on the second degradation coefficient, and compensates for the grayscale value of the second defective pixel based on a third degradation coefficient different from the first and the second degradation coefficients.

10. The display device according to claim 1, wherein the second compensated grayscale value is greater than the first compensated grayscale value under conditions of an identical driving time and a same grayscale value in the image data.

11. The display device according to claim 1, wherein the compensation component comprises:

an accumulation circuit that accumulates a grayscale value in the compensated data and calculates a driving time;

a memory device that stores the driving time; and a compensation circuit that calculates a compensation value of each of the plurality of pixels based on the driving time and the first and the second degradation coefficients, and compensates for the grayscale value in the image data using the compensation value.

12. The display device according to claim 1, wherein each of the plurality of pixels further includes:

a first transistor electrically connected between a first power line and a second power line;

a second transistor electrically connected between a data line and a gate electrode of the first transistor;

a third transistor electrically connected between a non-gate electrode of the first transistor and a sensing line; and a storage capacitor electrically connected between the gate electrode and the non-gate electrode of the first transistor, and wherein the plurality of stages are electrically connected between the non-gate electrode of the first transistor and the second power line.

13. A method, comprising:

providing a display device that includes a plurality of pixels, each of the plurality of pixels including a plurality of stages electrically connected in series, each of the plurality of stages including a plurality of light emitting elements;

detecting at least one defective pixel having a defect in the plurality of stages among the plurality of pixels by applying a driving voltage to the display device;

acquiring a first degradation coefficient of a normal pixel and a second degradation coefficient of the at least one defective pixel by the applying of the driving voltage to the display device for a reference time;

storing location information of the at least one defective pixel and the first and the second degradation coefficients in a storage component of the display device; and generating compensated data by:

calculating a first compensated grayscale value of the normal pixel among the plurality of pixels based on the first degradation coefficient and adding the first compensated grayscale value to a grayscale value in image data of the normal pixel to compensate for the grayscale value of the normal pixel based on a difference between a target luminance and a first degraded luminance; and calculating a second compensated grayscale value of the at least one defective pixel corresponding to the location information based on the second degradation coefficient different from the first degradation coefficient and adding the second compensated grayscale value to a grayscale value in the image data of the at least one defective pixel to compensate for the grayscale value of the at least one defective pixel based on a difference between the target luminance and a second degraded luminance.

14. The method according to claim 13, wherein the first degradation coefficient comprises a coefficient in an equation defining a luminance of the normal pixel that degrades based on a driving time of the normal pixel, the second degradation coefficient comprises a coefficient in an equation defining a luminance of the at least one defective pixel that degrades based on a driving time of the at least one defective pixel, a change in the luminance increases as any of the first and the second degradation coefficients increase, and the second degradation coefficient of the at least one defective pixel is greater than the first degradation coefficient of the normal pixel.

15. The method according to claim 13, wherein each of the plurality of pixels further includes an identical pixel circuit that provides a driving current to the plurality of stages, each of the plurality of pixels include a same number of stages, and each of the plurality of light emitting elements of each of the plurality of pixels have an identical size and emit light of an identical color.

16. The method according to claim 13, wherein the detecting of the at least one defective pixel comprises:

capturing an image of the display device and acquiring a thermal infrared image;

detecting a defective stage having the at least one defective pixel among the plurality of stages from the thermal infrared image; and acquiring the location information of the at least one defective pixel based on the defective stage.

17. The method according to claim 13, wherein each of the plurality of pixels is composed of two stages, and the detecting of the at least one defective pixel comprises acquiring only the location information of the at least one defective pixel and is absent acquiring location information of the normal pixel and is absent of acquiring information about a number of defective stages.

18. The method according to claim 13, wherein each of the plurality of pixels includes at least three stages, the at least one defective pixel comprises a first defective pixel composed of one defective stage having at least one defective light emitting element, and a second defective pixel including two defective stages each having at least one defective light emitting element, and the detecting of the at least one defective pixel comprises acquiring location information of each of the first and the second defective pixels and acquiring information about a number of defective stages.

19. The method according to claim 13, wherein each of the first degradation coefficient and the second degradation coefficient includes a grayscale coefficient, a temperature coefficient, a frequency coefficient, and an emission duty coefficient that respectively represent a grayscale value, a driving temperature, a driving frequency, and a change in luminance according to an emission duty of the pixels, and the acquiring of the first and the second degradation coefficients each comprises:

acquiring the grayscale coefficient while changing the grayscale value;

acquiring the temperature coefficient while changing the driving temperature;

acquiring the frequency coefficient while changing the driving frequency; and acquiring the emission duty coefficient while changing the emission duty.

20. The method according to claim 13, further comprising:

generating data voltages based on the compensated data; and providing the data voltages to the plurality of pixels.

* * * * *